(12) United States Patent
Holliday et al.

(10) Patent No.: US 11,830,274 B2
(45) Date of Patent: Nov. 28, 2023

(54) DETECTION AND IDENTIFICATION SYSTEMS FOR HUMANS OR OBJECTS

(71) Applicant: Infrared Integrated Systems Limited, Northamptonshire (GB)

(72) Inventors: Stuart Andrew Holliday, Northamptonshire (GB); Timothy J. Wheatley, Northamptonshire (GB); Neil Johnson, Devon (GB)

( * ) Notice: Subject to any disclaimer, the term of this patent is extended or adjusted under 35 U.S.C. 154(b) by 500 days.

(21) Appl. No.: 16/738,683

(22) Filed: Jan. 9, 2020

(65) Prior Publication Data
US 2020/0226363 A1 Jul. 16, 2020

Related U.S. Application Data

(60) Provisional application No. 62/791,082, filed on Jan. 11, 2019.

(51) Int. Cl.
*G06V 40/10* (2022.01)
*G06T 7/246* (2017.01)
(Continued)

(52) U.S. Cl.
CPC ............ *G06V 40/103* (2022.01); *G06T 7/248* (2017.01); *G06V 10/764* (2022.01); *G06V 20/52* (2022.01);
(Continued)

(58) Field of Classification Search
CPC .... G06T 7/248; G06K 9/00778; H04W 4/029
See application file for complete search history.

(56) References Cited

U.S. PATENT DOCUMENTS 5,581,625 A 12/1996 Connell
6,712,269 B1 3/2004 Watkins
(Continued)

FOREIGN PATENT DOCUMENTS

EP 1798670 A1 6/2007
EP 3229047 A1 10/2017
(Continued)

OTHER PUBLICATIONS

Hanchuan Li et al; "ID-Match", Human Factors in Computing Systems, ACM, 2 Penn Plaza, Suit 701, New York, NY, May 7, 2016, pp. 4933-4944 (Year: 2015).*
(Continued)

*Primary Examiner* — Myron Wyche

(57) ABSTRACT

A tracking system includes one or more wireless tags, a sensing device, and a processor. The sensing device is configured to generate sensing data representative of one or more people or objects in a scene. The processor is configured to detect the presence of the wireless tags within the scene. The processor is further configured to receive sensing data representative of objects in the scene and to identify tracks corresponding to the objects. The processor is further configured to process the received sensing data to generate a track descriptor associated with each of the identified objects, each track descriptor being representative of attributes of the corresponding object. The processor is also configured to analyze track descriptors associated with tracks when a wireless tag is present in the target scene. The processor is further configured to determine tracks associated the wireless tags based on the track descriptors present in the scene.

21 Claims, 14 Drawing Sheets

(51) Int. Cl.
*H04W 4/029* (2018.01)
*H04W 4/021* (2018.01)
*G06V 20/52* (2022.01)
*G06V 10/764* (2022.01)

(52) U.S. Cl.
CPC ............ *G06V 20/53* (2022.01); *H04W 4/021* (2013.01); *H04W 4/029* (2018.02); *G06T 2207/20084* (2013.01); *G06T 2207/30196* (2013.01); *G06T 2207/30232* (2013.01)

(56) References Cited

U.S. PATENT DOCUMENTS

| | | | |
|---|---|---|---|
| 7,623,936 B1 | 11/2009 | Qu et al. | |
| 7,652,687 B2 | 1/2010 | Sorensen | |
| 7,702,132 B2 | 4/2010 | Crabtree | |
| 7,778,855 B2 | 8/2010 | Holliday | |
| 8,615,420 B2 | 12/2013 | Holliday | |
| 9,993,166 B1 | 6/2018 | Johnson et al. | |
| 10,765,308 B2* | 9/2020 | Sabczynski | A61B 90/36 |
| 2004/0229022 A1* | 11/2004 | Bourdelais | B42D 25/333 428/195.1 |
| 2005/0104959 A1 | 5/2005 | Han et al. | |
| 2005/0222723 A1 | 10/2005 | Estes et al. | |
| 2005/0286767 A1* | 12/2005 | Hager | G06K 9/00208 382/190 |
| 2006/0203088 A1* | 9/2006 | Hammoud | G06K 9/00597 348/78 |
| 2007/0008113 A1 | 1/2007 | Spoonhower et al. | |
| 2007/0098222 A1* | 5/2007 | Porter | G06K 9/00362 382/103 |
| 2008/0067244 A1 | 3/2008 | Marks | |
| 2008/0077511 A1 | 3/2008 | Zimmerman | |
| 2008/0239073 A1 | 10/2008 | Ruohonen et al. | |
| 2009/0097706 A1 | 4/2009 | Crabtree | |
| 2010/0039233 A1 | 2/2010 | Niedzwiecki et al. | |
| 2010/0061553 A1 | 3/2010 | Chaum | |
| 2010/0235004 A1 | 9/2010 | Thind | |
| 2010/0299116 A1 | 11/2010 | Tomastik et al. | |
| 2011/0024500 A1 | 2/2011 | McReynolds et al. | |
| 2011/0213588 A1 | 9/2011 | Lin et al. | |
| 2012/0191272 A1 | 7/2012 | Andersen et al. | |
| 2012/0274775 A1 | 11/2012 | Reiffel | |
| 2012/0281094 A1 | 11/2012 | Forshaw | |
| 2012/0310376 A1 | 12/2012 | Krumm et al. | |
| 2014/0107846 A1 | 4/2014 | Li | |
| 2015/0022321 A1 | 1/2015 | Lefevre | |
| 2015/0032556 A1 | 1/2015 | Evans et al. | |
| 2015/0224640 A1 | 8/2015 | Vu et al. | |
| 2015/0235237 A1 | 8/2015 | Shaw et al. | |
| 2015/0339920 A1 | 11/2015 | Cortelyou et al. | |
| 2017/0091993 A1* | 3/2017 | Andrew | G06F 3/04812 |
| 2017/0181401 A1 | 6/2017 | Lefevre et al. | |
| 2017/0278264 A1 | 9/2017 | Liu et al. | |
| 2017/0316262 A1 | 11/2017 | Holliday et al. | |
| 2018/0089616 A1 | 3/2018 | Jacobus et al. | |
| 2018/0349710 A1* | 12/2018 | Houri | G06K 9/00778 |
| 2019/0012607 A1 | 1/2019 | Holliday et al. | |
| 2019/0033974 A1* | 1/2019 | Mu | G06F 3/0308 |

FOREIGN PATENT DOCUMENTS

| | | | | |
|---|---|---|---|---|
| WO | PCT/AU2018/432834 | * | 7/2018 | ........... A63F 13/533 |
| WO | 2019191146 A1 | | 10/2019 | |

OTHER PUBLICATIONS

Senior, Andrew W., et al. "Video analytics for retail", 2007 IEEE Conference on Advanced Video and Signal Based Surveillance. IEEE, 2007, 6 pgs.

International Search Report and Written Opinion of the ISA/EP in PCT/EP2020/050603, dated Mar. 31, 2020, 12 pgs.

Hanchuan, et al., "ID-Match: A Hybrid Computer Vision and RFID System for Recognizing Individuals in Groups", In Proceedings of the 2016 CHI Conference on Human Factors in Computing Systems, 12 pgs.

Fukuda, et al., "Personal identification in dynamic images using UHF band RFID system for service provision", 2008 IEEE International Conference on Multisensor Fusion and Integration for Intelligent Systems, 6 pgs.

Antunes, D., "Multi-sensor Based Localization and Tracking for Intelligent Environments," Dissertation to Obtain the Master Degree in Informatics and Computer Engineering, Technical University of Lisbon, Oct. 2011, 88 pgs.

Basalamah, A., "Sensing the Crowds Using Bluetooth Low Energy Tags," IEEE Access, 4:4225-4233, Aug. 2016, 9 pgs.

Connell et al. "Retail Video Analytics: An Overview and Survey," Video Surveillance and Transportation Imaging Applications, Proc. vol. 8663. International Society for Optics and Photonics, Mar. 2013, 7 pgs.

Extended Search Report for EP Application No. 14178914.9, dated Jul. 3, 2015, 6 pgs.

International Search Report and Written Opinion of the ISA/EP in PCT/EP2019/066525, dated Sep. 23, 2019, 14 pgs.

Texas Instruments, "Introduction to the Time-of-Flight (ToF) System Design," Users Guide, Literature No. SBAU219D, May 2014, 32 pgs.

Texas Instruments, "Time-of-Flight Camera—An Introduction," Technical White Paper, Literature No. SLOA190B, May 2014, 10 pgs.

Yamamiya et al., "Using Infrared-Transparent Pigments to Identify Objects," Systems and Computers in Japan, 33(10):74-82, Sep. 2002, 9 pgs.

* cited by examiner

DETECTION AND IDENTIFICATION SYSTEMS FOR HUMANS OR OBJECTS

CROSS REFERENCES

This application claims the benefit of U.S. Provisional Application No. 62/791,082, filed Jan. 11, 2019, the content of which is hereby incorporated by reference in its entirety.

BACKGROUND

Several known systems and methods exist to count or detect people or objects, for example near points of service, such as customers waiting in line at retail locations, people or objects at shop floors, airports, hospitals, secured areas, and the like. Counting and detection systems may facilitate shortening wait times at a point of service, and monitor traffic (e.g., number of people present in a specific location) in an area of interest. Such systems are described, for instance, in U.S. 2017/0316262A1 and U.S. 2015/0032556 A1 each assigned to InfraRed Integrated Systems Ltd., Northampton, GB. Another count and detection system is the Gazelle 2 Dual View System developed by InfraRed Integrated Systems Ltd., Northampton, GB.

Some such detection and counting systems typically rely on directly detecting and counting people, using direct detection/sensing method such as video analytics from CCTV coverage of the space, direct human counting (e.g., via biometric recognition) or RFID, WiFi or other tags, active transmitters, optical methods (e.g., reflective clothing, identification badges, facial recognition and the like). Such systems may also rely on people crossing an area (e.g., a "virtual" line being crossed) to determine a count.

While such systems may provide an overall count of people or objects in the space, it may not provide additional data relating to counted people or objects. For instance, such systems may not be able to ignore people or objects not necessary for a count. In one such case, several known counting and detection systems may not be able to ignore specific people (e.g., staff members) from the total count (e.g., including staff members and visitors/customers). In some such cases, for instance, a single staff member may walk past a sensed area (e.g., a specific hallway or a door) multiple times during a day. Because the system is unable to distinguish between staff members and customers, the system may end up counting a single staff member several times in the count, and therefore distort the count. This problem may be exacerbated in situations where traffic from several staff members through a door is a significant fraction of the total traffic of people in a retail outlet.

There are many applications in which it is desirable to be able to exclude specific people from a count, such as members of staff. For example, in retail people counting it is common to determine the ratio of customers to sales, as a metric for measuring the success at the store (sometimes referred to as a "conversion ratio"). In this instance, it is very desirable to exclude staff members from the count of how many people have entered the store, such as a security guard who stands in or near a doorway.

There may be other applications where it is desirable to exclude, separately count, or count only particular people. For example, in an airport, it may be desirable to raise an alert if anyone other than specific security personnel walks the wrong way down a corridor. Similarly, in a high security, or hazardous environment, it may be desirable to allow only specific individuals into an area, and to raise an alert if any other individuals are seen entering.

Existing solutions to this problem include, for example, actively scanned identification (e.g., barriers at an entrance with swipe card access), facial recognition technology, and wireless tags carried by members of staff combined with some means of correlation or positioning of such tags, such as triangulation using three detectors.

However, problems exist for each such solution. Barriers or other physical checks are very intrusive, may be costly, and are not suitable for a retail environment. Facial recognition is often quite intrusive, and is difficult to achieve from an arbitrary viewpoint. Excluding staff using wireless tags also has some problems. For instance, systems employing multiple detectors to triangulate the position of the tags can be quite costly and complex to install, operate, and maintain. Wireless location detection can also be difficult because wireless signals are reflected from many surfaces, and can be strongly absorbed by water (and people). This means that there is considerably uncertainty in the location of people tracked using wireless tags, which can make it difficult to determine if the people with the tags have crossed a line or entered a region, or are merely close to the line or region. This is especially true where the person is dwelling in the counting area for a long time, such as a security guard. This means that the counts from the wireless system may be quite inaccurate, and so subtracting these from the people counter counts may introduce possibly large errors.

SUMMARY

In general, the disclosure describes systems and methods for identifying certain people or objects based data captured from sensing devices. For instance, the disclosure describes systems and methods to distinguish people or objects from other people or objects for a variety of purposes. Such distinctions may be useful, for example, in secure facilities and/or facilities having one or more secure areas, such as airports, train stations, power plants, military sites, prisons, and/or a factory or industrial location that may have hazardous environments only certain personnel are authorized access. In further examples, systems and methods disclosed herein can be used to identify and track individual items within a space, such as shopping carts within a store, containers within a warehouse, vehicles within a parking lot or on a road, and the like. It will be appreciated that various disclosed examples may be applied to a wide range of applications involving counting specific people or objects and/or excluding specific people or objects.

In one example, a system for detecting specific people is described. The system includes a sensing means, a wireless signal, and a computing means. The computing means is configured to process the sensing means, create a plurality of track descriptors for image sequences that correspond to people walking through a scene, recognize the presence or non-presence of the wireless signal, determine one or more track descriptors of the plurality of track descriptors which are most frequently occurring when the wireless signal is present, and generate a signal when a person is tracked who matches the one or more track descriptors, when the wireless signal is also present.

In another example, a method for detecting people is described. The method includes processing a sensing means, creating a plurality of track descriptors for image sequences that correspond to people walking through a scene, recognizing a presence or non-presence of a wireless signal, determine one or more track descriptors of the plurality of track descriptors which are most frequently occurring when the wireless signal is present, and generating a signal when a person is tracked who matches the one or more track descriptors, when the wireless signal is also present.

In another example, a tracking system is described. The tracking system includes one or more wireless tags. The tracking system also includes a sensing device configured to generate sensing data representative of one or more people or objects in a scene. The tracking system further includes a processor configured to detect a presence of the one or more wireless tags within the scene, receive the sensing data from the sensing device representative of people or objects in the scene, identify tracks within the scene corresponding to the people or objects within the scene, process the received sensing data to generate a distinct track descriptor for each of the identified people or objects within the scene, each track descriptor being representative of one or more attributes of the corresponding person or object detectable via the sensing device, analyze each track descriptor associated with a track present in the target scene when at least one of the one or more wireless tags is present in the target scene, and determine one or more tracks associated the one or more wireless tags based on the track descriptors present in the scene with the detected one or more wireless tags.

In another example, a method is described, the method including detecting one or more of tracks within a scene, calculating, for each of the one or more detected tracks, a track descriptor, each track descriptor being representative of one or more appearance attributes corresponding to a person or object represented by the detected track, for each detected track, determining, based on the calculated track descriptor associated with the track, whether or not the track corresponds to a person or object of interest, and performing a tracking process in which tracks corresponding to people or objects of interest are handled differently than tracks not corresponding to people or objects of interest.

In another example, a tracking system is described. The tracking system includes a sensing device configured to generate sensing data representative of one or more people or objects in a scene. The tracking system further includes a plurality of detectable elements having one or more properties identifiable by the sensing device. The tracking system also includes a processor configured to receive sensing data from the sensing device representative of people or objects in the scene, identify tracks within the scene corresponding to people or objects within the scene, process the received sensing data to generate a track descriptor associated with each of the identified people or objects within the scene, each track descriptor being representative of one or more attributes of the corresponding person or object detectable via the sensing device, and determine one or more tracks associated with people or objects of interest based on a detected signature in the generated track descriptors representative of the presence of one or more of the plurality of detectable items.

The details of one or more examples of the disclosure are set forth in the accompanying drawings and the description below. Other features, objects, and advantages of the disclosure will be apparent from the description and drawings, and from the claims.

DETAILED DESCRIPTION

Systems and methods disclosed herein can be used for identifying certain people or objects based data captured from sensing devices. In some aspects of the disclosure, systems and methods disclosed herein are capable of distinguishing people or objects from others for a variety of purposes. For example, in retail applications, it may be beneficial to count the number of people entering a store. However, in some such cases, it may be advantageous to exclude staff members who work at the store from the count so that the door counts more accurately reflect the true number of customers. In another example, it may be beneficial for an automatic queue measurement system to be able to ignore staff members when determining the length of the queue, so that the queue measurement reflects only those waiting in the queue. In yet another example, systems and methods disclosed herein may be used to identify if people are walking a particular direction, such as down a corridor, but ignore certain members of staff who may be permitted or expected to walk in such a direction. Such distinctions may be useful, for example, in secure facilities and/or facilities having one or more secure areas, such as airports, train stations, power plants, military sites, prisons, and/or a factory or industrial location that may have hazardous environments only certain personnel are authorized access. In further examples, systems and methods disclosed herein can be used to identify and track individual items within a space, such as shopping carts within a store, containers within a warehouse, vehicles within a parking lot or on a road, and the like. It will be appreciated that various disclosed examples may be applied to a wide range of applications involving counting specific people or objects and/or excluding specific people or objects.

Figure 1:
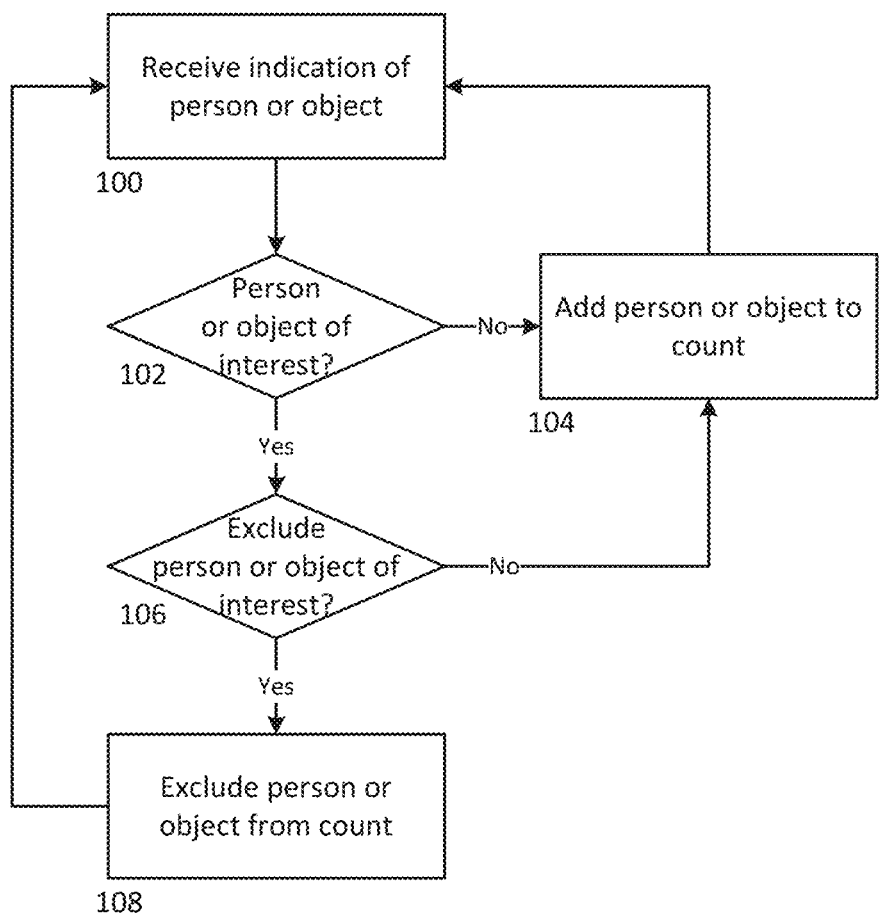
FIG. 1 shows an exemplary process for adding and excluding objects from a queue, in accordance with one or more techniques of this disclosure.

FIG. 1 shows an exemplary process for adding and excluding objects from a queue. The process includes receiving an indication of a person or object (100), and determining if the person or object is a person or object of interest, such as a certain classification of object (e.g., a store employee) (102). If the person or object is not a person or object of interest, the person or object can be added to a count of people or objects (104), and the process repeats. If the person or object is identified as a person or object of interest, if people or objects of interest are excluded from the count (106), the person or object of interest is excluded (108) and the process repeats. However, if the person or object of interest is not excluded at step 108, the person or object is added to the count (104) and the process repeat.

In various examples, a process such as outlined in FIG. 1 can be employed to count people or objects in a space, such as in a commercial space. In some such examples, people or objects of interest can include certain categories of people, such as employees and/or security personnel. Depending on the motivation for counting objects or people, such individuals may be excluded from the count. For example, when counting or monitoring people in queues in a retail establishment, employees are likely not contributing to the queue even if the employee is proximate the queue area.

Tracking systems according to various examples can include one or more sensing devices used for counting objects in a space via sensing data, such as thermal data, depth image data, video data, or the like. In various examples, tracking systems can include one or more visible light cameras, infrared (IR) cameras, structured lighting depth scanners, LIDAR scanners, and/or stereo camera systems. In some examples, tracking systems can include one or more illuminators, for example, to aid in sensing and/or tracking people or objects in a scene. In some examples, illuminators are configured to emit light in one or more non-visible spectrums of light, such as infrared, terahertz, or millimeter wave radiation.

Figure 2A:
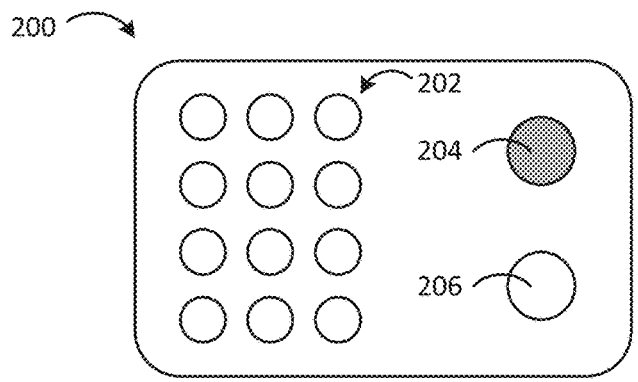
FIG. 2A shows an exemplary time of flight sensor that can be configured to detect people or objects in a space, in accordance with one or more techniques of this disclosure.

In some examples, multiple sensing devices can be embodied in a single tool. FIG. 2A shows an exemplary time of flight sensor that can be configured to detect people or objects in a space. Time of flight sensor 200 includes an illuminator 202 configured to illuminate a scene, for example, with near infrared light. A time of flight camera 206 can be configured to receive overlapping wavelengths of light as are illuminated by the illuminator 202 (e.g., near infrared light). The time of flight sensor 200 of FIG. 2 further includes a visible light camera 204. The time of flight sensor 200 can operate similar to those produced by Infrared Integrated Systems Ltd. In some examples, time of flight sensor 200 illuminates a scene via illuminator 202 and receives light from the scene at the time of flight camera 206. Based on the timing of the received signal relative to the illumination, the time of flight sensor 200 can be configured to determine a depth profile of the target scene. Visible light image data from visible light camera 204 can be used to supplement this depth profile and provide context to the scene.

Figure 2B:
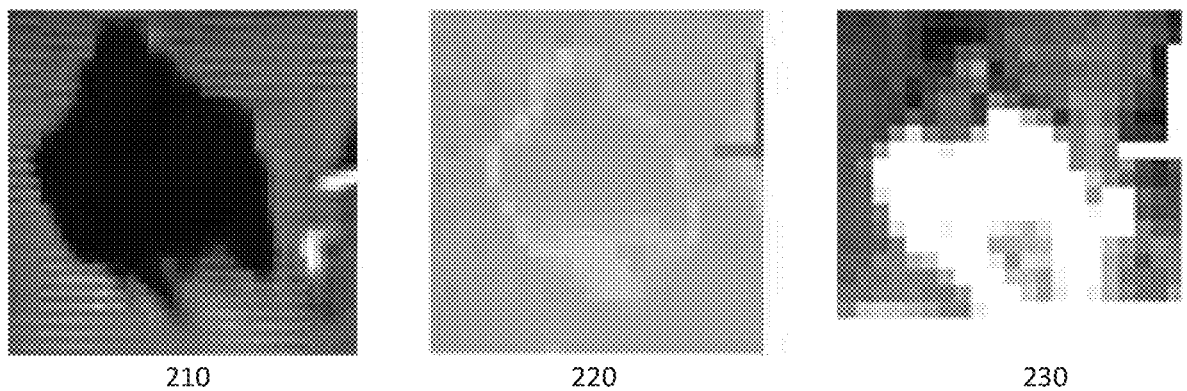
FIG. 2B shows exemplary data streams available from an exemplary time of flight sensor, in accordance with one or more techniques of this disclosure.

FIG. 2B shows exemplary data streams available from an exemplary time of flight sensor such as sensor 200 in FIG. 2A. Data streams include a visible light image 210, depth information 220, and the signal received at the time of flight camera 230, which can be used to calculate the depth information 220. In some examples, one or more such data streams can be used to identify people or objects in the field of view of the sensor 200.

During exemplary operation, when one or more people or objects move through the field of view of a tracking sensor (e.g., time of flight sensor 200), the locations of such people or objects are tracked by a computer vision system (e.g., software configured to identify such people or objects from data provided by the tracking sensor). When implemented as a people counter, for example, people that walk through the field of view of a sensor are recorded in a sequence of images (e.g., similar to 210, 220, and/or 230), and the movement of each person within the scene from frame to frame is aggregated into a track. Tracks and/or individual scenes can be analyzed in real time and/or after data has been collected over a period of time (e.g., at the end of a day, end of a week, etc.) to perform various analyses.

As described elsewhere herein, when tracking people and/or objects in a space, it can often be useful to identify particular people and/or objects (e.g., store employees) for consideration in the use of the tracking information (e.g., for exclusion from queue counting processes, etc.). One way of doing so includes assigning such people or objects a wirelessly detectable tag (e.g., an RFID tag) identifying such a person or object of interest.

Figure 3A:
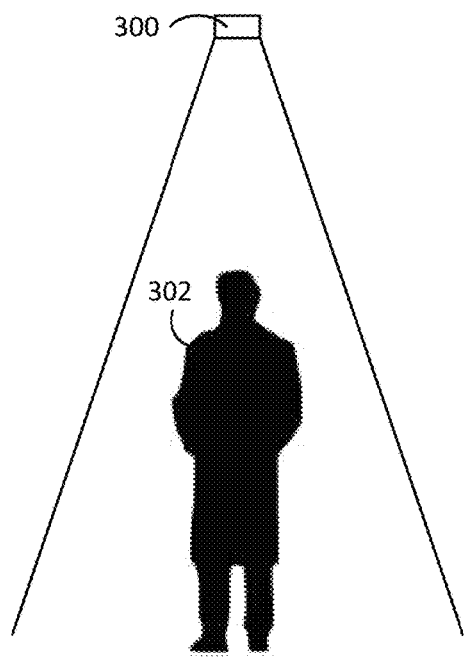
FIGS. 3A-3C show views of a person being detected by a tracking system, such as a time of flight sensor, in accordance with one or more techniques of this disclosure.
Figure 3B:
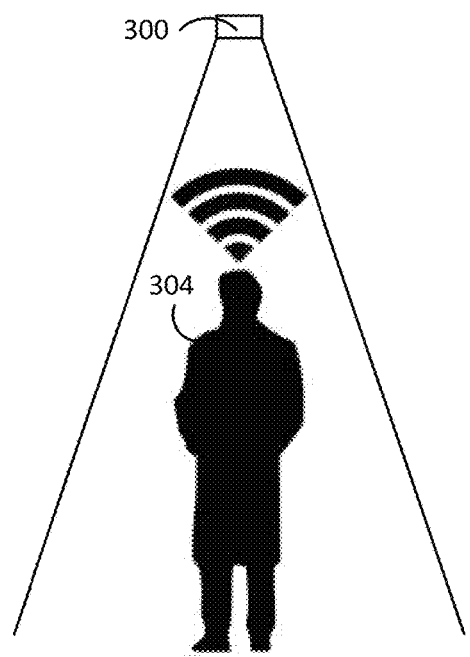

FIGS. 3A and 3B show views of a person being detected by a tracking system, such as a time of flight sensor. In FIG. 3A, the person 302 has no wireless tag, while the person 304 in FIG. 3B includes a wireless tag. In some examples, the tracking system 300 can choose to count the person 302 in FIG. 3A and ignore or eliminate the person 304 in FIG. 3B from analysis if desired.

Figure 3C:
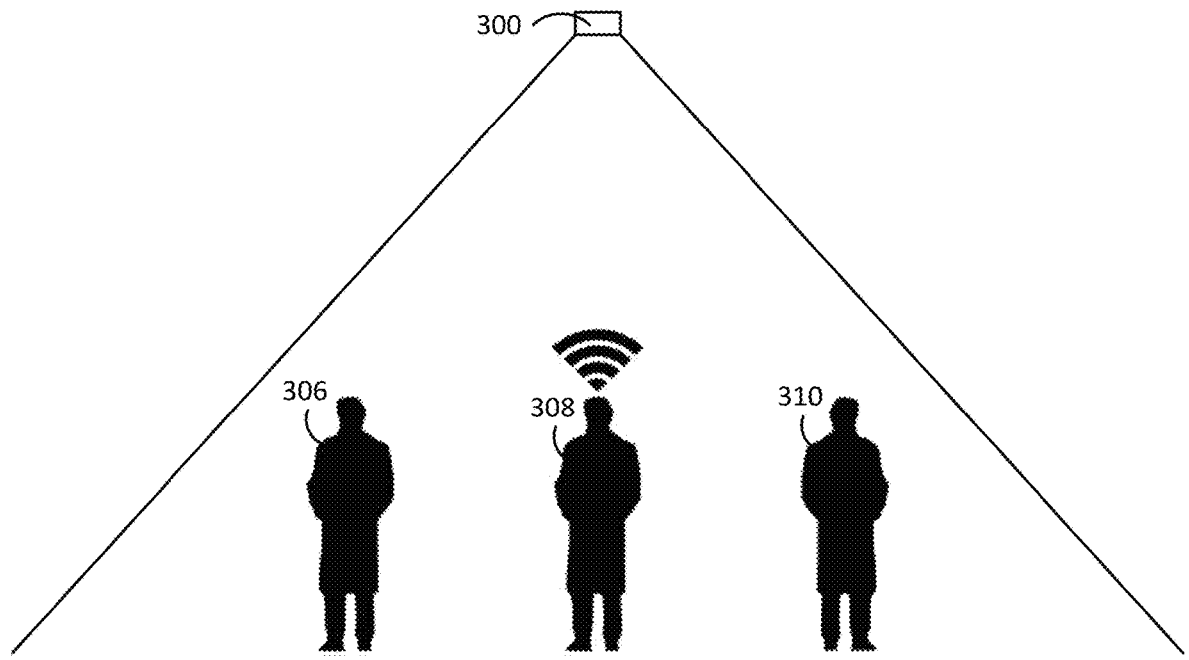

However, problems can arise if more than one person is present in a scene in which a wireless tag is present. For instance, FIG. 3C shows a space including three people, person 306, person 308, and person 310. As shown, of the three, only person 308 has a wireless tag. However, if the tracking system 300 is not capable of triangulating or otherwise determining the precise location of the wireless tag, the system 300 may not know which person to ignore or eliminate from analysis if desired.

In some examples, a tracking system can be configured to utilize additional data to establish descriptions of individual identified people and/or objects within a space. For example, with respect to the time of flight sensor 200 in FIG. 2, visible light image data from the visible light camera 204 can be combined with determined depth information to profile a detected person or object. In an exemplary example, sensing data of a person or object (e.g., visible light image data, depth data, etc.) can be analyzed to establish an image descriptor of the person or object within the image. In some examples, each identified person or object within a scene can be analyzed to determine a unique image descriptor corresponding to the identified person or object.

Figure 4A:
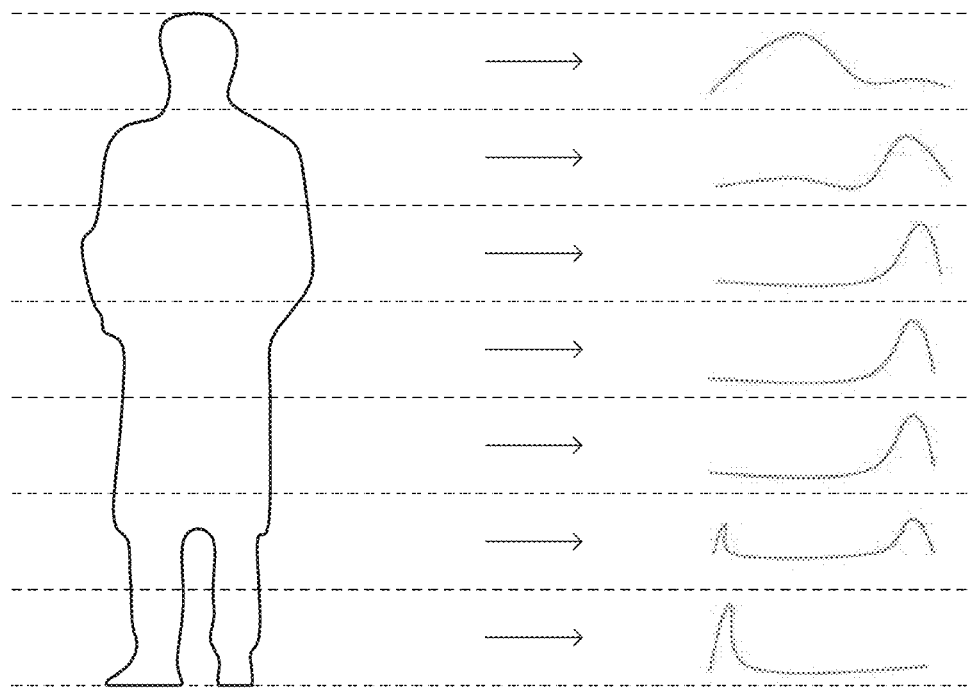
FIGS. 4A and 4B show exemplary processes for generating an image descriptor of a person detected by a tracking system, in accordance with one or more techniques of this disclosure.
Figure 4B:
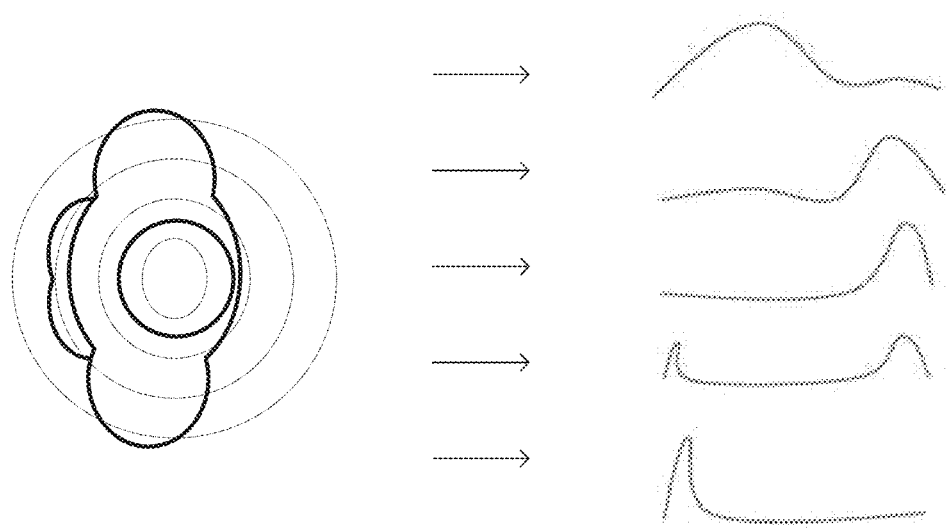
Figure 5A:
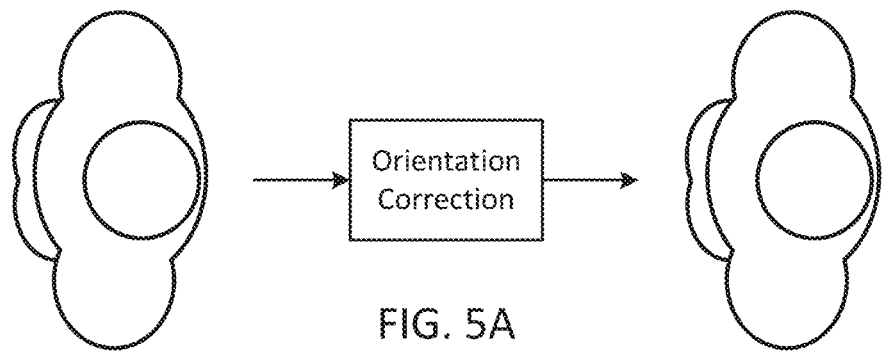
FIGS. 5A-5D show exemplary orientation correction processes on overhead views of identified people in a scene, in accordance with one or more techniques of this disclosure.
Figure 5B:
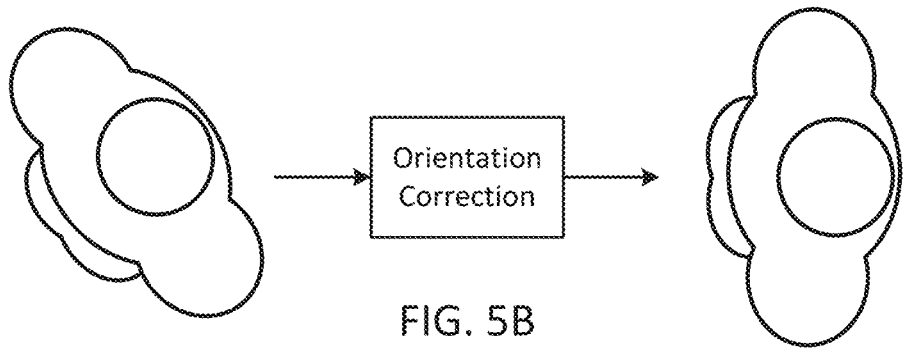
Figure 5C:
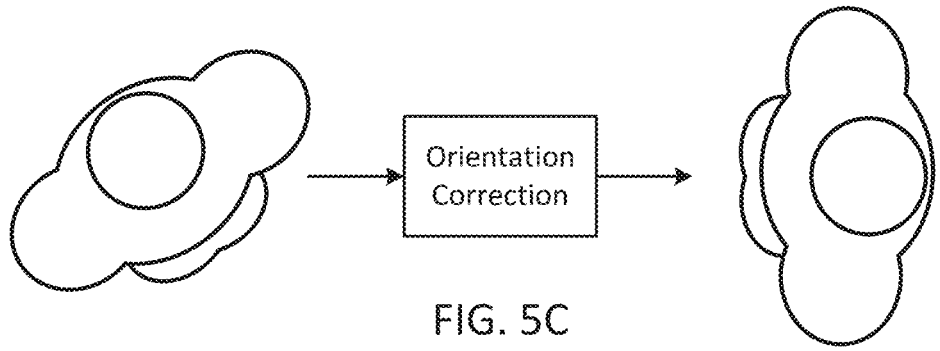
Figure 5D:
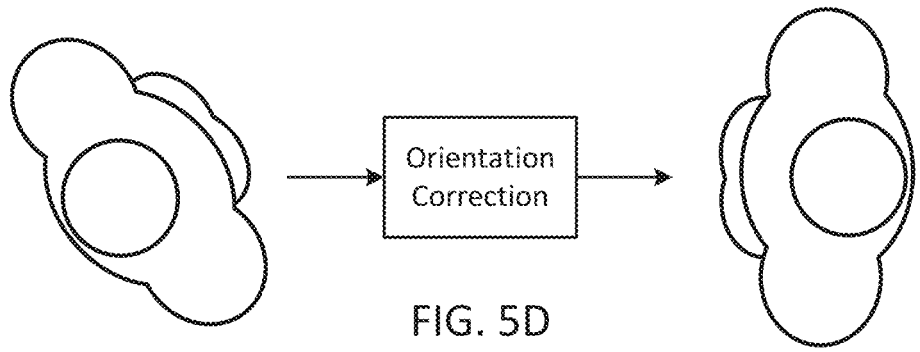

FIGS. 4A and 4B show exemplary processes for generating an image descriptor of a person detected by a tracking system. FIG. 4A shows an elevation view of a person segmented into a plurality of ranges by height. In the exemplary implementation of FIG. 4A, each height range includes corresponding data representative of the image data that is found in that range. In an exemplary example, the corresponding data comprises, for each height range, a color distribution histogram of the image data in that height range. Such a color distribution histogram can be analyzed and/or represented using a mixture model, such as a Gaussian Mixture Model (GMM). In various examples, any number of height ranges, including a single height range, can be used, and can be based on absolute measurements (e.g., 1 height segment per foot, etc.) or relative measurements (e.g., an identified person or object is segmented into a particular number of ranges).

FIG. 4B shows an overhead view of a person segmented into a plurality of height ranges. For example, depth information from a time of flight or other appropriate sensor can be used to map each portion of the image data to a height and/or a height range within the scene. Corresponding image data (e.g., visible light image data) can similarly be associated with the determined depth profile. For instance, in some examples, each pixel in the visible light image data can be mapped to a height or height range. Each height range can be analyzed for content, such as for a color distribution histogram for each height range as described with respect to FIG. 4A.

The height profile information (e.g., color histograms for each height range) associated with an identified person or object within an image can be used as an image descriptor associated with the identified person or object. While described above using color histograms by height range as an example, a variety of other data can be used. In some examples, height is a convenient dimension in which to analyze separate ranges since people or objects will often maintain a vertical orientation while in the space of interest regardless of the pointing direction of the person or object. In addition or alternatively to color information, other data from the collected sensor data can be used to describe the identified person or object, such as shape or texture information associated with one or more height ranges of the person or object. One or more pieces of information associated with a given person or object identified in the scene can be used to generate an image descriptor associated with that person or object.

In some examples, when viewing people or objects from an overhead view, the tracking system can be configured to manipulate views of identified people or objects in the scene in order to make such views more uniform. For example, in some examples, a tracking system can be configured to rotate overhead views of identified people or objects to a default orientation so that, when analyzed, each person or object is facing a similar direction. FIGS. 5A-5D show exemplary orientation correction processes on overhead views of identified people in a scene. As shown, sensing data (e.g., including depth information, visible light information, etc.) for each identified person undergoes orientation correction such that person or object represented in the resulting data has a common orientation for more consistent analysis when forming an image descriptor for the person. In some examples (e.g., FIG. 5A), sensing data (e.g., image data, depth data, etc.) may show a person already facing in the common orientation. In some such examples, the effect of the orientation correction may minimal, since the orientation requires little to no correction. In other examples, the system may detect the orientation of the identified person or object as being in the common orientation, and may skip the orientation correction process for that person or object. Other forms of pre-processing sensing data for preparing the data for analysis can be performed, such as changing a perspective (e.g., manipulating 3-dimensional image data as a view from directly overhead), mapping data into alternate coordinate systems (e.g., polar coordinates), or the like.

Figure 6:
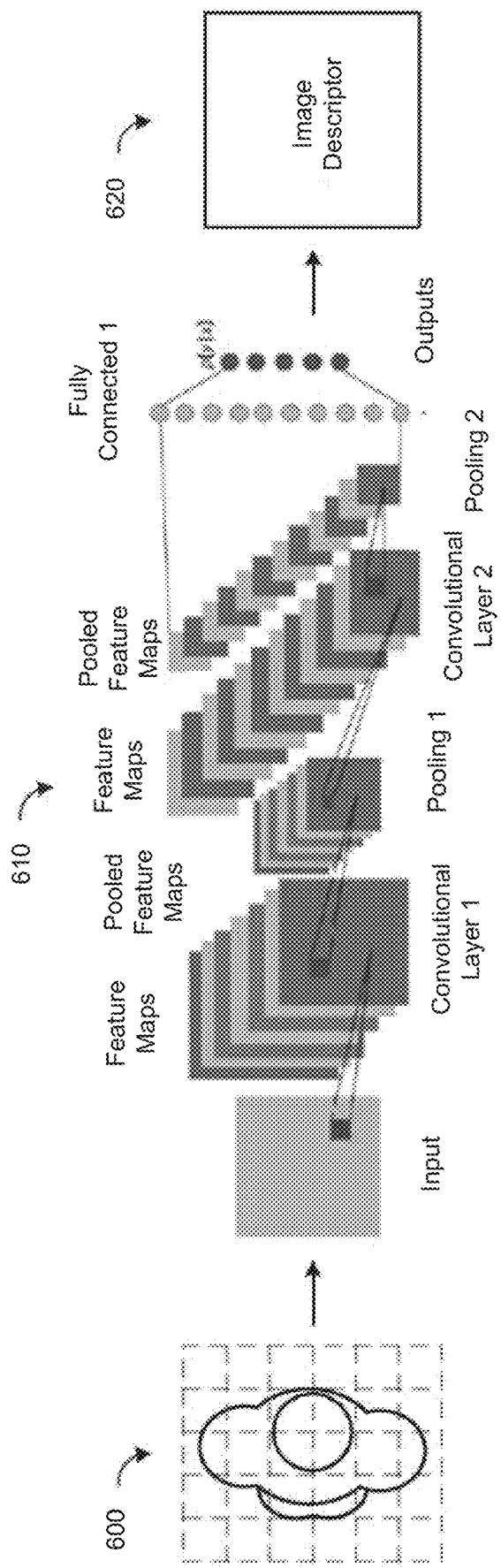
FIG. 6 shows an exemplary CNN for generating an image descriptor, in accordance with one or more techniques of this disclosure.

Additional or alternative processes can be used to determine image descriptors for people or objects identified by a tracking system. For example, in some examples, sensing data representing an identified person or object from the tracking system (e.g., depth and/or image data) can be fed into a convolutional neural network (CNN) in order to generate an image descriptor for the identified person or object. An exemplary CNN for generating an image descriptor is shown in FIG. 6. As shown, sensing data 600 (e.g., including visible light image data and depth information) is fed into CNN 610. The sensing data 600 is processed to generate an image descriptor 620 representative of the sensing data.

Utilizing neural networks can include training the system via, for example, classification using a supervised dataset and/or comparing pairs of images or other sensing data and generating a probability that the images are of the same person or object.

In some examples, a recurrent neural network can be arranged to operate on a sequence of data frames (e.g., visible light images and corresponding depth information) taken from a track associated with a person or object, produce a descriptor that best represents the track and which can be used to directly classify the track as being a particular person and/or can to compare pairs of tracks.

Other methods for generating an image descriptor can be used. In yet another example, sensing data from a tracking system (e.g., visible light image data and or depth data) can be analyzed in a variety of ways. In some examples, data can be transformed into another coordinate system, for example, via a polar transformation. Angular distributions of captured data (e.g., depth information, color, texture, etc.) can be analyzed, for example, via a histogram and/or mixture model, to determine image descriptor information representative of an identified person or object. While many different techniques are possible, determining image descriptors associated with identified people or objects generally involve analyzing data representing an identified person or object in a space in a consistent way so that image descriptors can be compared to one another.

During operation of a tracking system, as a person or object is tracked through a space through a plurality of frames of data, a track can be associated with the person or object representing the behavior of the person or object from frame to frame. The track can be analyzed to determine a track descriptor associated therewith. A track descriptor can include, for example, information in the image descriptor and/or information regarding the motion of the person or object through the space over a series of frames. For instance, in addition or alternatively to the information included in individual image descriptors, a track descriptor can include information about a person or object's velocity or other motion information. In some examples, a tracking system can recognize patterns in motion, such as a limp or distinctive walking style, for example, based on analysis of the identified person or object from frame to frame.

Figure 7:
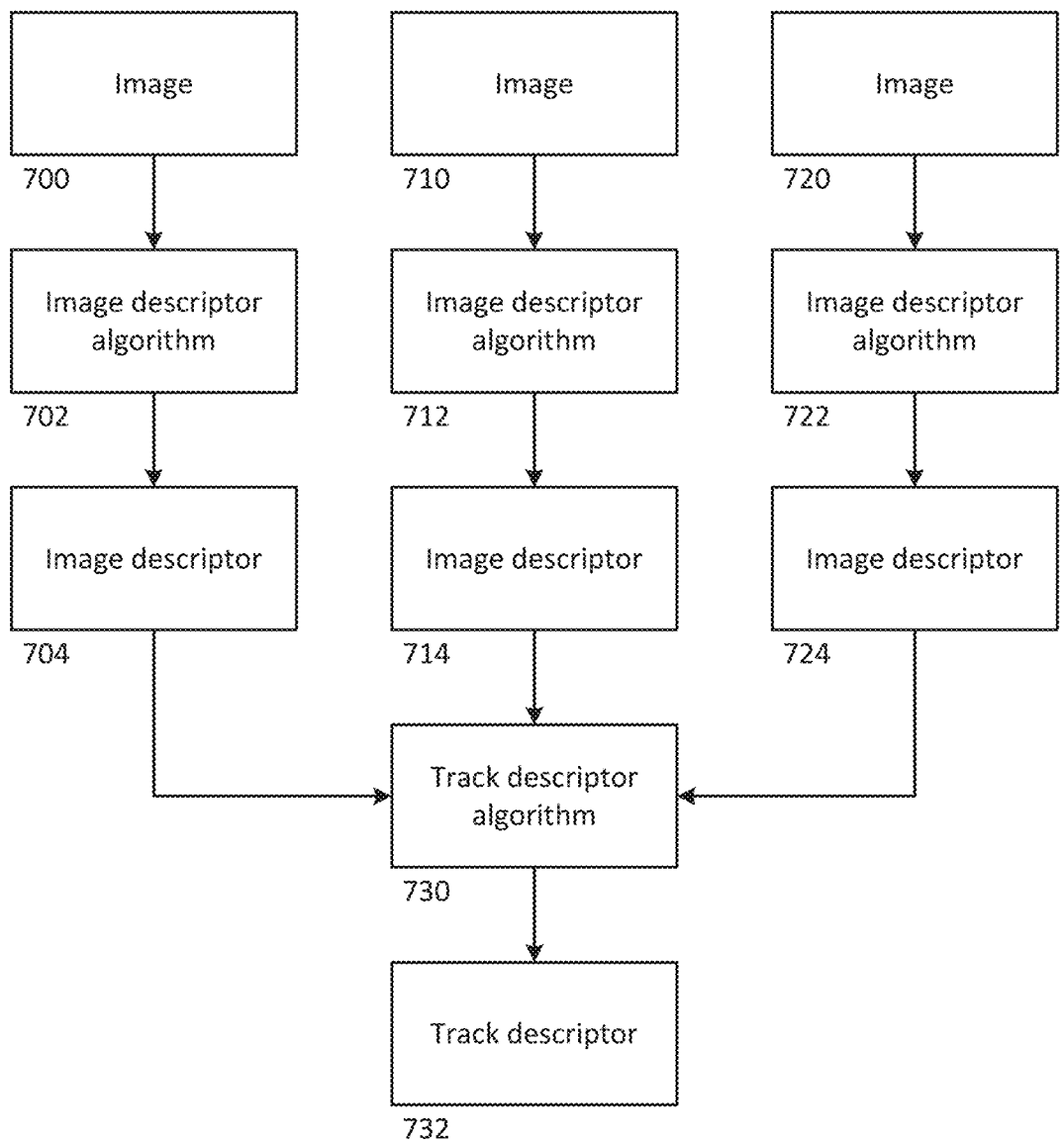
FIG. 7 shows an exemplary process for generating a track descriptor from a series of images (e.g., a plurality of frames of data captured by a tracking system), in accordance with one or more techniques of this disclosure.

FIG. 7 shows an exemplary process for generating a track descriptor from a series of images (e.g., a plurality of frames of data captured by a tracking system). As shown, image 700 is captured and processed according to an image descriptor algorithm 702 to generate an image descriptor 704. The image 700 can include or otherwise be combined with a variety of information, including, for example, visible light image data, infrared image data, time of flight data, depth data, and the like. The image descriptor algorithm 702 can include one or more analyses for characterizing the image based on the image data and/or associated sensing data. An example of an image descriptor algorithm applied at step 702 can include rotating sensing data captured from a tracking system to a common orientation (e.g., as shown in FIGS. 5A-5D) and generating data (e.g., color, texture, etc.) distributions among a plurality of depth ranges in the collected sensor data.

A plurality of images (700, 710, 720) including a common identified person or object can be similarly processed with an image descriptor algorithm (702, 712, 722). In some examples, the same image descriptor algorithm is applied to each image. In other examples, different image descriptor algorithms may be used for different images (e.g., an image descriptor algorithm excluding an orientation correction step may be used if a proper orientation is detected).

As described elsewhere herein, an identified person or object can be associated with a track across a plurality of images (e.g., images 700, 710, 720). In some examples, the image descriptors (704, 714, 724) associated with a track corresponding to particular identified person or object from each image (700, 710, 720) and/or the track of the identified person or object can be analyzed via a track descriptor algorithm 730 to determine a track descriptor 732 representative of the track. The track descriptor algorithm can include analysis of the motion of the person or object across a plurality of images and/or image descriptor information. In an exemplary example, described textually for purposes of illustration, a track descriptor 732 of a person can include a height measurement, a colorimetric distribution by height, and an average moving velocity of the person through a scene. Additionally or alternatively, track descriptors can include an aggregation (e.g., average) or a distribution e.g., a Gaussian distribution) of the different image descriptors associated with a given track across a plurality of data frames.

For instance, in some examples, image descriptors (e.g., 704) can include a Gaussian distribution of color distributions by height (e.g., as described with respect to FIGS. 4A and 4B). A sequence of such data frames (e.g., including color image and depth information) can include a distribution of such distributions over the plurality of frames. In some such examples, the (time/frame) distribution of (colorimetric) distributions can be analyzed to form a track descriptor (e.g., 732).

Figure 8A:
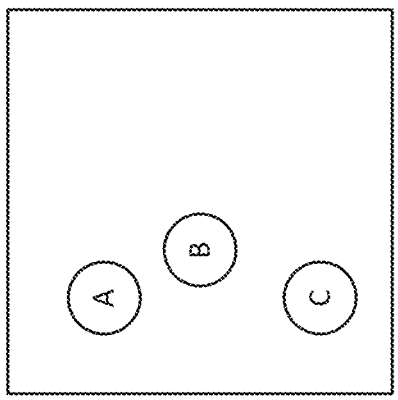
FIGS. 8A-8C show a series of frames of exemplary image data showing the motion of three people within a scene, in accordance with one or more techniques of this disclosure.
Figure 8B:
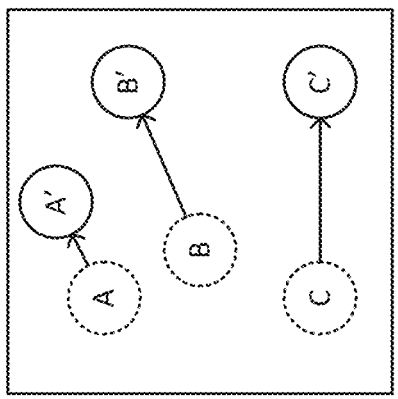
Figure 8C:
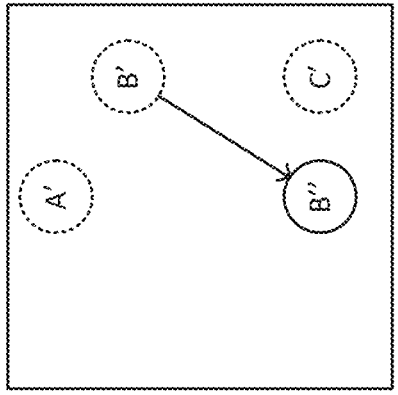

In general, sensing data from a tracking system, such as an image or a sequence of images, can include a plurality of people or objects to be tracked. Each identified person or object in the image can be separately analyzed despite the fact that multiple people or objects appear together in a frame of sensing data. FIGS. 8A-8C show a series of frames of exemplary image data showing the motion of three people within a scene. As shown in FIG. 8A, people are located at positions A, B, and C within the scene. In FIG. 8B, each person has moved to a new position: from A to A', from B to B', and from C to C'. In FIG. 8C, the person at position A' remains at position A' and the person at position C' remains at position C'. However, the person that was at position B' in FIG. 8B has moved to position B".

Figure 9A:
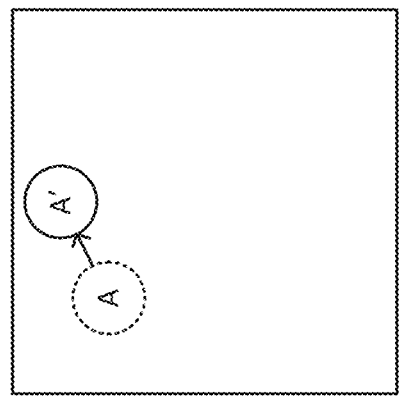
FIG. 9A shows a track associated with the person navigating from position A to position A' in FIGS. 8A-8C, in accordance with one or more techniques of this disclosure.
Figure 9B:
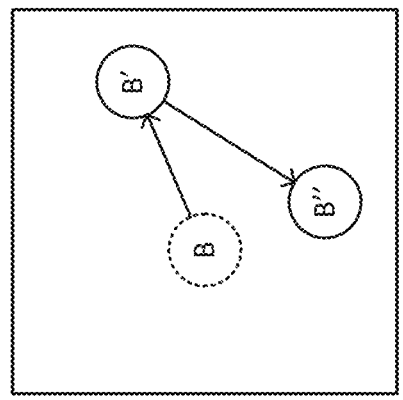
FIG. 9B shows a track associated with the person navigating from position B to position B' to position B" in FIGS. 8A-8C, in accordance with one or more techniques of this disclosure.
Figure 9C:
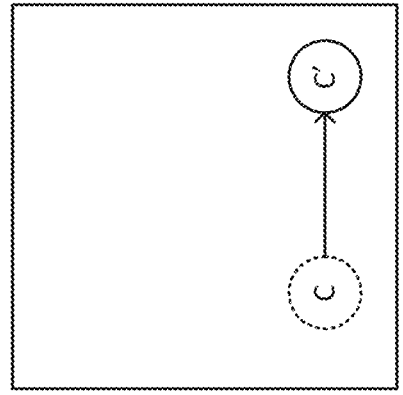
FIG. 9C shows a track associated with the person navigating from position C to position C' in FIGS. 8A-8C, in accordance with one or more techniques of this disclosure.

As noted elsewhere herein, individual people or objects can be tracked from frame to frame even if a plurality of such people or objects are viewed within the scene. FIG. 9A shows a track associated with the person navigating from position A to position A' in FIGS. 8A-8C. FIG. 9B shows a track associated with the person navigating from position B to position B' to position B" in FIGS. 8A-8C. FIG. 9C shows a track associated with the person navigating from position C to position C' in FIGS. 8A-8C. In general, tracking systems can be configured to separately analyze any number of separately identifiable people or objects present in a scene simultaneously.

Figure 10:
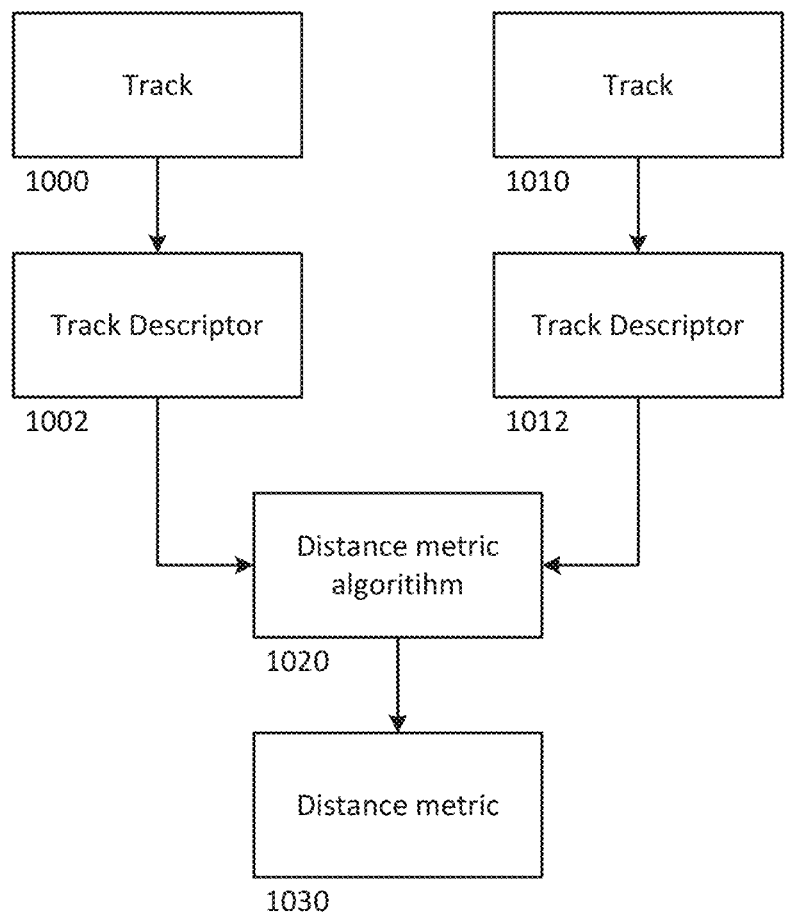
FIG. 10 shows an exemplary process for comparing track descriptors associated with identified tracks, in accordance with one or more techniques of this disclosure.

In some examples, track descriptors associated with tracks of identified people or objects can be compared to one another to determine how similar or different the track descriptors are from one another. FIG. 10 shows an exemplary process for comparing track descriptors associated with identified tracks. As shown, tracks 1000 and 1010 are used to determine track descriptors 1002, 1012, respectively. The track descriptors 1002 and 1012 are analyzed by a distance metric algorithm 1020 in order to determine a distance metric 1030 representative of how alike or different the tracks 1000 and 1010 are.

In a general example, a track descriptor algorithm maps each track into a metric space including the resulting track descriptors. In some examples, each track descriptor includes an N-dimensional vector including N values describing the track. Example values can include height/depth information, color information, texture information, person or object motion information, or other information captured by or otherwise determinable from information captured by the tracking system. An exemplary distance metric between two track descriptors represented by N-dimensional vectors is a Euclidean distance. In various examples, a distance metric can be defined in a variety of ways to designate a distance between different track descriptors in the metric space.

In some examples, a distance metric can be learned or trained, for example, using known data sets. In various examples, the distance metric is trained such that the likelihood of two descriptors corresponding to the same person or object is inversely proportional to the distance between vectors in the metric space. In various examples, a neural network can be trained to create this distance metric, or other existing methods can be used, such as KISSME, LDML, ITML or LMNN, or a simple weighting for each dimension can be learned or set, so as to optimise the accuracy, and a simple weighted Euclidean distance metric applied. A threshold on the computed distance metric can then be used to determine if two tracks are sufficiently similar to be of the same person. In various examples, different processing techniques, such as using a Siamese Network approach, can be used to compare track descriptors to determine whether or not two tracks are sufficiently similar to be of the same person.

In some examples, utilizing distances between track descriptors and/or locations in a metric space can be used to identify people or objects of interest.

Figure 11A:
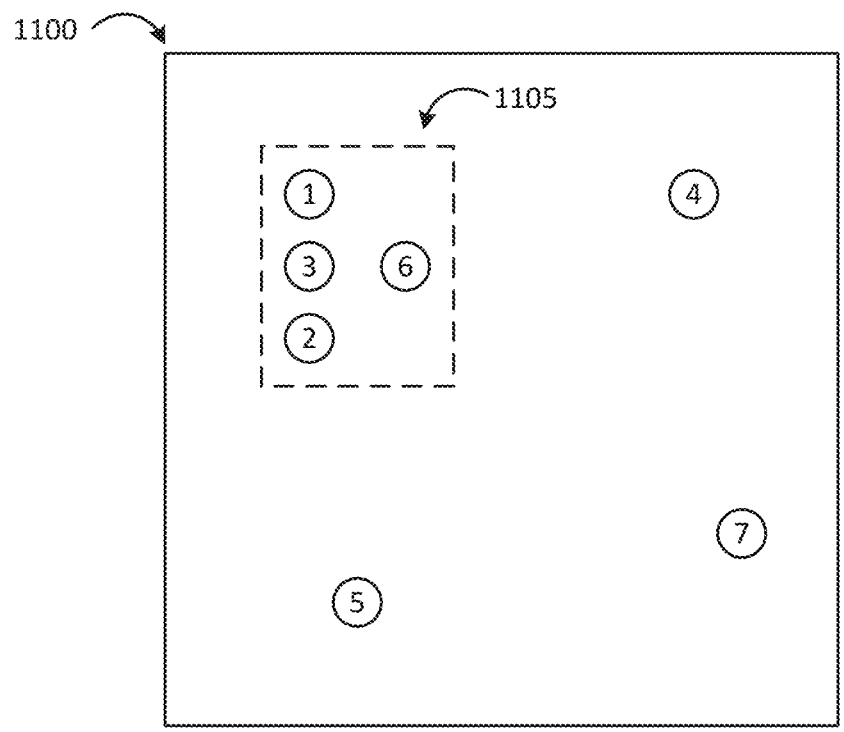
FIGS. 11A and 11B show an illustrative example of adjusting a people count utilizing track descriptors, in accordance with one or more techniques of this disclosure.
Figure 11B:
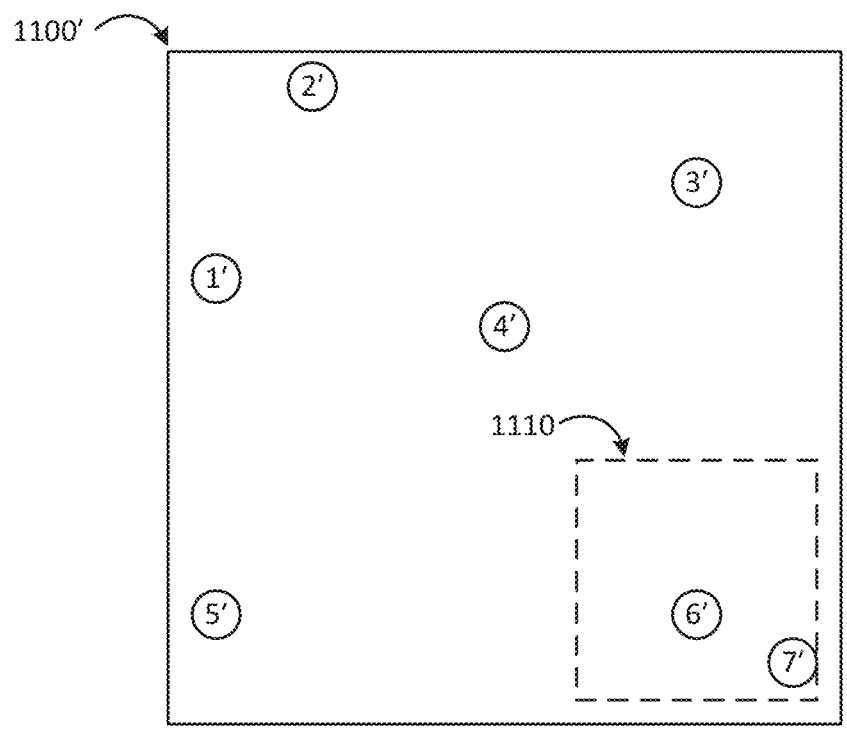

FIGS. 11A and 11B show an illustrative example of adjusting a people count utilizing track descriptors. FIG. 11A shows a plurality of tracks within a space 1100. Tracked people 1, 2, 3, 4, 5, 6, and 7 are shown in a space 1100. In the illustrated example, the tracking system is configured to count people within zone 1105, such as, for example, people in a checkout area in a retail space. As shown, people 1, 2, 3, and 6 are within the zone 1105. A simple count would show four people within the zone of interest 1105.

FIG. 11B is a graphical representation of an example metric space for track descriptors. As shown, track descriptors 1', 2', 3', 4', 5', 6', and 7' are shown in metric space 1100' and correspond to people 1, 2, 3, 4, 5, 6, and 7, respectively. The location of each track descriptor in the metric space 1100' is representative of information regarding the individual track associated with a person or object, such as image descriptor information, movement information, or the like. In general, tracks that are closer together in the metric space 1100' are more similar than tracks that are further apart.

As described elsewhere herein, in some examples, a track descriptor associated with an identified person or object can include and/or be based on information related to the appearance of the person or object, such as color information, color distribution information, height information, etc. Thus, in some such examples, the location of the track descriptor in the metric space 1100' can represent appearance information associated with a corresponding person or object, and tracks that are closer together represent objects that are more similar in appearance than those that are further apart. Thus, in such implementations, track descriptors associated with the general public (e.g., shoppers in a retail establishment), having a wide range of appearances based on height, clothing color, etc., will be scattered throughout the metric space 1100'.

In some examples, track descriptors are defined such that people or objects of interest tracked within a space (e.g., employees in a retail space) have a distinctive track descriptor, for instance, based on a distinctive appearance. For example, in some instances, employees in a retail store may wear distinctive uniforms, distinctive badges, etc. that contribute to the location of the track descriptors in the metric space. Various implementations can include providing people or objects of interest with identifiable articles, such as a retroreflective article configured to reflect incident light from a time of flight sensor illuminator (e.g., 202) back to the time of flight camera (e.g., 206) and/or an article having a distinctive appearance in a non-visible wavelength spectrum, such as infrared or ultraviolet, that may be detected by a sensor in the tracking system. Exemplary retroreflective configurations are described in U.S. Provisional Patent Application No. 62/688,634, filed Jun. 22, 2018, and which is assigned to the assignee of the instant application and is incorporated herein by reference.

In some such examples, common features (e.g., appearance attributes) intentionally deployed among people or objects of interest in a space will appear within a particular portion of the metric space associated with the common features (e.g., common color appearances, time of flight camera intensity, etc.), while people or objects not including such common features will often fall outside of such a portion of the metric space (e.g., due to a lack of uniform, retroreflective article, etc.). For example, with respect to FIG. 11B, metric space 1100' includes region 1110 defining a subset of possible track descriptors within the metric space 1100'. The boundary of the region 1110 can be used to demarcate people or objects of interest from the general population. For instance, in the illustrated example, track descriptors 6' and 7' fall within the region 1110 of the metric space 1100'. In some examples, the tracking system determines that the tracks associated with track descriptors 6' and 7' represent tracks of people or objects of interest, for example, employees in a retail space.

In some examples, the tracking system can be configured to selectively exclude such tracks from various operations, for example, via the process described with respect to in FIG. 1. For instance, with respect to FIGS. 11A and 11B together, track descriptor 6' being within region 1110 can be used to identify the corresponding person 6 as being a store employee. In some instance, store employees are not desired for counting when counting the number of people within zone 1105. Thus, in some such examples, in view of analysis of the track descriptor 6', person 6 can be excluded from the count of people in zone 1105.

In various examples, zone 1105 can be defined according to a predictable distinctive appearance of a person or object of interest. For instance, in some examples, staff uniforms are often designed to be distinctive. In other occasions, they may be distinctive given the context, for example a security guard wearing a white shirt will be fairly distinctive in a retail shopping location where few people are wearing a white shirt, but not in an office environment where many people are so dressed.

If the member of staff is not wearing clothing that is sufficiently distinctive, then they may be able to wear a distinctive badge or item. For instance, as described elsewhere herein, a retroreflective item, such as a badge or lanyard, can be used to identify a person, for example, in view of a time of flight sensor (e.g., 200 in FIG. 2). In some such examples, retroreflective material reflects incident radiation (e.g., from illuminator 202) directly back towards the source (captured by time of flight camera 206), meaning that within the time of flight camera view, the retroreflector will often appear extremely bright compared to other things.

In some examples, the time of flight device uses a high frequency modulated signal, which means that it discounts ambient light sources, so the retroreflector will appear bright even compared to white objects in full sunlight, for example.

It is possible to coat retroreflective materials with substances which act as an IR-pass filter, meaning that the retroreflector can be made to have any appearance in the visible light spectrum, but still operate normally as a retroreflector within the IR light spectrum.

As an alternative, a distinctively colored badge or item of clothing could be used, for example, including a color component in the infrared spectrum. For instance, some visually dark materials are bright in infrared, but few bright materials are dark in infrared wavelengths. For example, there are dyes which are bright red or bright blue, but which are black in infrared wavelengths around 800 nm. These will appear very distinctive when viewed using a combination of visible and infrared cameras and can be used to identify people wearing clothing or other items displaying such properties. Such exemplary distinguishing appearances can be utilized to define a region (e.g., 1105) in a track descriptor metric space that generally corresponds to a person or object of interest.

The descriptor used to identify people based upon their appearance can have many possible forms while providing a sufficiently recognizable signature to allow a tracking system to determine that a person or object is a person or object of interest based on analysis of the track descriptor associated therewith.

In some examples, a system need not be told what track descriptors are associated with people or objects of interest, but instead can be configured to recognize patterns of track descriptors, such as a higher recurrence of a particular appearance than is statistically likely given a random population. For instance, in a setting in which people or objects of interest often have a common appearance characteristic (e.g., a uniform), but one that may change from day today, a tracking system can be configured to recognize clusters of track descriptors in the track descriptor metric space and determine that such a region in the track descriptor space corresponds to people or objects of interest. Thus, in some examples, a system can be configured to learn track descriptor features that likely correspond to people or objects of interest.

In some cases, people or objects of interest do not necessarily have consistent appearances (e.g., employee uniforms). For instance as described with respect to FIGS. 3A-3C, people or objects of interest can be equipped with a wireless tag, such as an RFID tag or the like, however, it can be difficult to distinguish which track in an image corresponds to the track having the wireless tag. In some examples, a tracking system can be configured to identify sensing data that includes the presence of such a wireless tag and analyze tracks present in a scene in which the wireless tag was detected.

Figure 12A:
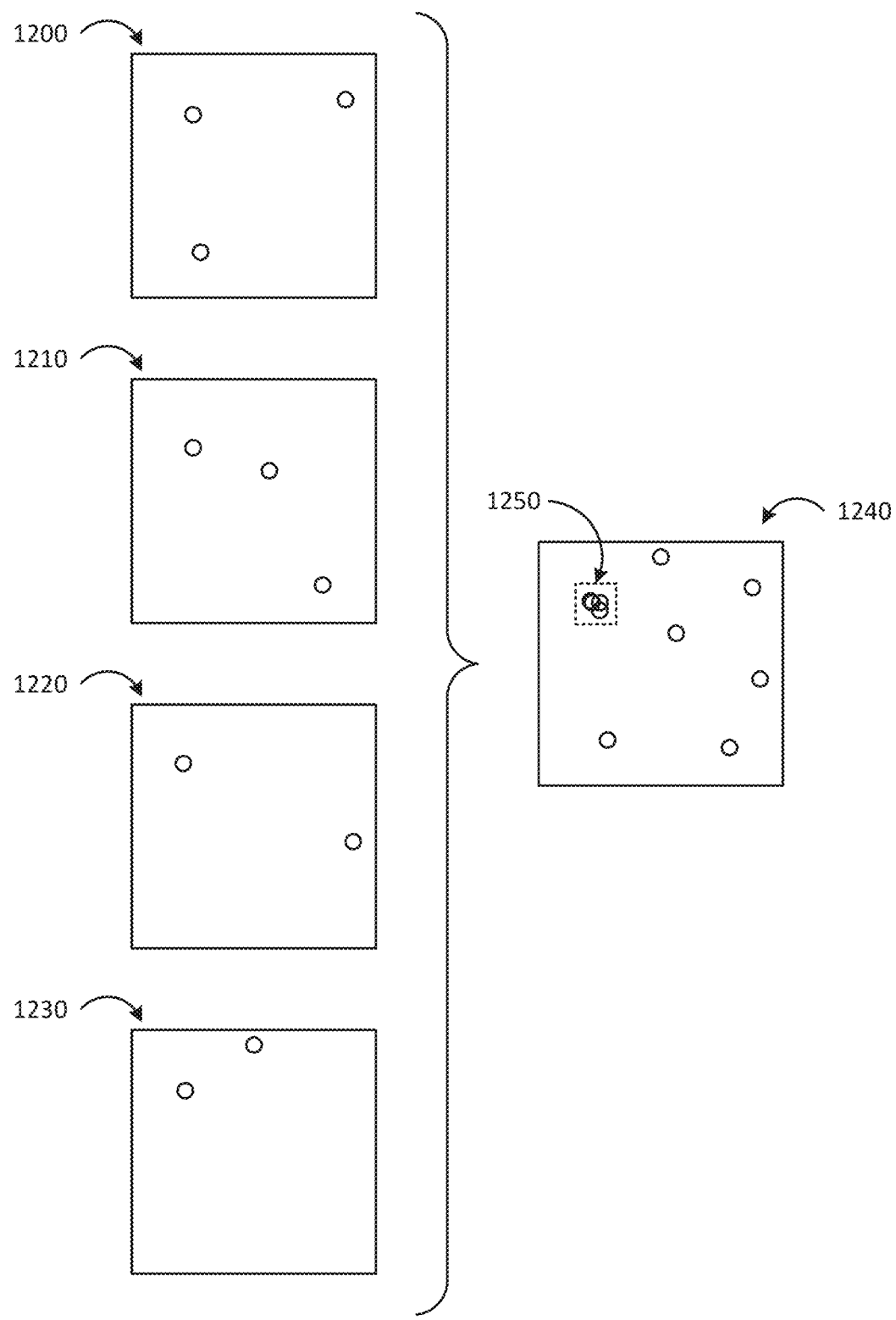
FIGS. 12A and 12B show an exemplary process for analyzing tracks present in a scene in which a wireless tag was detected, in accordance with one or more techniques of this disclosure.

FIG. 12 shows an exemplary process for analyzing tracks present in a scene in which a wireless tag was detected. In the example of FIG. 12, frames 1200, 1210, 1220, and 1230 show the locations of track descriptors within a metric space for a plurality of frames of data captured while a wireless tag was detected. As shown, the track descriptors present in each frame vary in location within the metric space. In general, tracks having widely different locations within the metric space are unlikely to correspond to the same person or object.

Frame 1240 shows an aggregation of the track descriptors present in frames 1200, 1210, 1220, and 1230 in which the wireless tag was detected. As shown, tracks are distributed throughout the space. However, several tracks are clustered within the region generally labeled 1250. The clustering of such tracks generally indicates that people or objects having a similar appearance, at least according to the image descriptor algorithm and/or track descriptor algorithm, were present in each of the frames 1200, 1210, 1220, and 1230.

In some examples, the tracking system can be configured to analyze the tracks present in each frame representing the scene when one or more wireless tags were present and determine one or more tracks as candidates for corresponding to the wearer of the wireless tag. That is, if a track descriptor appears in each of the frames of data during which the wireless tag was present (e.g., tracks within region 1250 in FIG. 12), the system can determine that such tracks correspond to the wearer of the wireless tag. Such analysis of a plurality of scenes in which the wireless tag is present can allow a system to identify which tracks likely correspond to those people or objects associated with the wireless tag for tracking analysis (e.g., to exclude such people or objects from a count, count such people or objects exclusively, etc.).

In various examples, such determinations can be used in subsequent tracking processes, for example, to disregard tracks having matching or similar (e.g., within a distance threshold in the metric space) track descriptors in future tracking processes. Additionally or alternatively, the determination of one or more identified tracks can be retroactively applied to one or more data frames to modify previous analysis. For instance, in some examples, sensing data in a tracking system can be collected throughout a period of time, such as over an hour, a day, a week, a month, etc. After or during the collection period, the system can be configured to determine which tracks correspond to people or objects of interest (e.g., employees). Such track designations can be applied as appropriate for different tracking processes.

For instance, in an exemplary example, the process is initiated at the start of a day. Data is captured throughout the day, and analyzed throughout and/or at the end of the day. Tracks corresponding to people or objects of interest (e.g., employees) can be identified (e.g., by determining the tracks consistently present when wireless tags are detected) and treated accordingly. For instance, information regarding queuing or overall occupancy data in a retail space tracked throughout the course of the day can be updated at the end of the day to exclude tracks that are determined to be associated with employees and should be excluded from the tracking data.

Figure 12B:
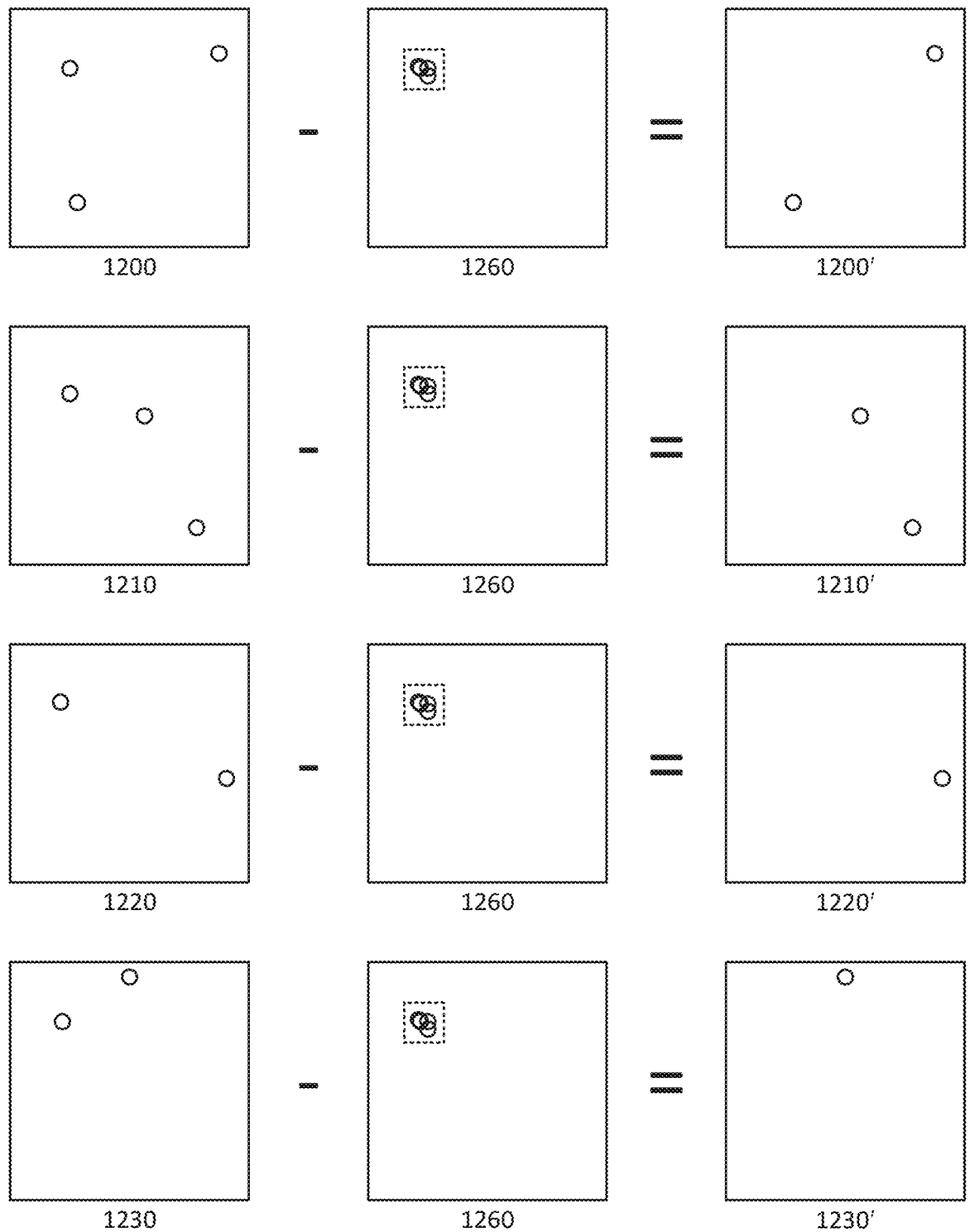

FIG. 12B illustrates an example process for eliminating people of interest from a count. With respect to FIG. 12A, via analysis of the track descriptors in frames 1200, 1210, 1220, and 1230 present in a scene when a wireless tag is present, a system can determine that tracks within region 1250 generally correspond to a person or object of interest to exclude from a counting/analysis process. Thus, frames 1200, 1210, 1220, and 1230 can be processed by eliminating track descriptors within region 1250, shown schematically by subtracting a data frame 1260 including track descriptors considered to be representative of a person or object of interest, to result in modified frames 1200', 1210', 1220', and 1230', each excluding the track descriptor associated with the person or object of interest. Tracks from the original sensing data (e.g., depth information, image data, etc.) corresponding to the remaining track descriptors in modified frames 1200', 1210', 1220', and 1230' can be analyzed for desired tracking information (e.g., queue length, occupancy, etc.) while disregarding certain tracks.

Utilizing data in such a way allows for people or objects of interest associated with wireless tags to be identified without requiring prior knowledge of such people or objects of interest.

In some examples, the system can be configured to estimate a best descriptor as a prediction of a track descriptor associated with a person or object of interest, for example, a person or object wearing an identifiable wireless tag, and use the best descriptor to determine whether or not a track corresponds to the person or object of interest. For instance, if a track descriptor associated with a particular person or object is within a predetermined distance of the best descriptor, the track associated with such person or object is considered to represent the person or object of interest. In some examples, additionally calculated track descriptors (e.g., in the presence of a detected wireless tag) can be used to update the location of the best descriptor in the metric space, for example, using a mean shift algorithm.

Figure 13A:
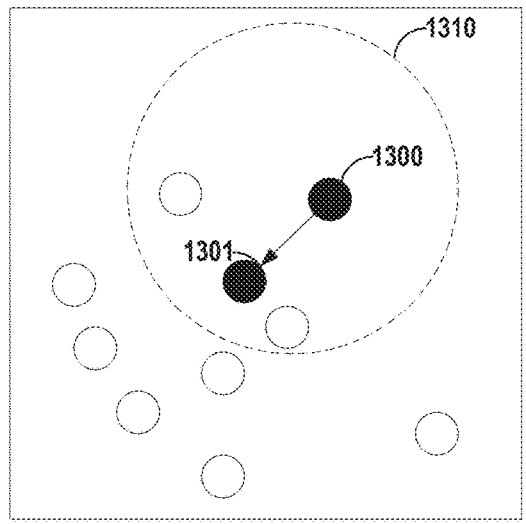
FIGS. 13A-13C show a process for updating a best descriptor prediction in a metric space in view of a plurality of track descriptors, in accordance with one or more techniques of this disclosure.
Figure 13B:
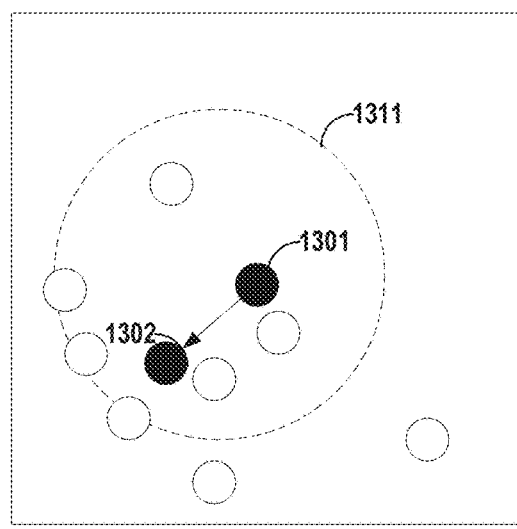
Figure 13C:
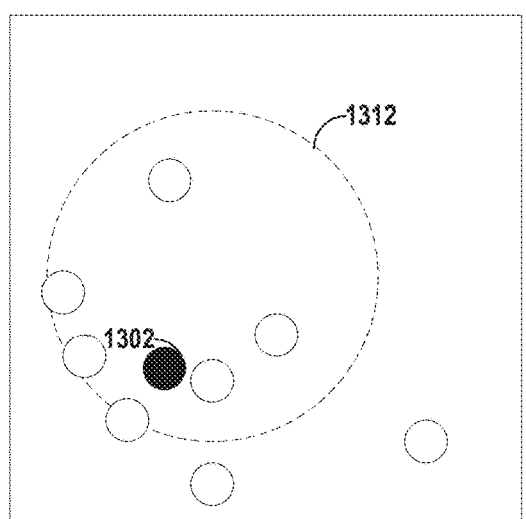

FIGS. 13A-13C show a process for updating a best descriptor prediction in a metric space in view of a plurality of track descriptors. In the illustrated examples, shaded circles represent locations of estimated best descriptors, while unshaded circles represent calculated track descriptors in the metric space. FIG. 13A shows an initial best descriptor 1300 and a neighborhood 1310 surrounding the best descriptor 1300. In some examples, the neighborhood 1310 corresponds to a region in the metric space within a predetermined distance of the best descriptor 1300. In the illustrated example, additional track descriptors are found within the neighborhood 1310 of the best descriptor 1300.

The system can be configured to calculate an average position of the track descriptors that are within the neighborhood 1310 of the initial best descriptor 1300 (e.g., within a predetermined distance as defined by the metric space) in order to calculate an updated best descriptor. As shown, in view of the track descriptors within the neighborhood 1300, the best descriptor is updated to position 1301.

FIG. 13B shows a next step in the process, in which a new neighborhood 1311 surrounds the updated best descriptor 1301, which captures even more track descriptors within the metric space. By repeating the process and performing an average position of the track descriptors in the updated neighborhood 1311, the location of the best descriptor is again updated, this time to location 1302.

FIG. 13C shows an updated neighborhood 1312 around updated best descriptor 1302. As shown, no new track descriptors are captured by updating the neighborhood (to 1312) based on the updated best descriptor location (1302), so the process is stopped with location 1302 corresponding to the best descriptor.

In some examples, such a process can be continually repeated as new track descriptors are added. For instance, as more track descriptors fall within a predetermined distance of a best descriptor (e.g., within a neighborhood), the location of the best descriptor can be updated to reflect an average of those descriptors within the neighborhood. Such averaging can accommodate for some variation in a person or object of interest appearing multiple times with a wireless tag, such as viewing the person or object from a slightly different angle, if a person is carrying different objects, or other changes over time. In other examples, such analysis is performed a finite number of times on a finite number of collected track descriptors to establish a neighborhood in the metric space corresponding to a person or object of interest. The neighborhood can remain static until the process is restarted (e.g., at the end of a day).

In some examples, the best descriptor (e.g., a continually updating best descriptor) can be used in conjunction with a distance analysis (e.g., analysis of the distance between a track descriptor and the best descriptor) to determine if calculated track descriptors correspond to people or objects of interest. For instance, with respect to FIG. 12A, track descriptors in region 1250 can be used to determine a best descriptor and to define a neighborhood surrounding the best descriptor such that tracks that are within that neighborhood are considered to correspond to people or objects of interest.

In some examples, the best descriptor can be viewed as the descriptor which lies at the point of highest local density within the feature descriptor space, that is to say the point with the most other points nearby. In some examples, to find this point, the set of all tracks that are present at the same time as the wireless tag can be taken, and the distances between all of the tracks measured according to the distance defined on the metric space. The tracks which correspond to a person or object of interest (e.g., a staff member) could be taken as the largest set of tracks that are sufficiently self-similar (e.g., within a neighborhood of one another within the metric space).

A mean shift algorithm can be used to find a point within the descriptor metric space that has the highest local density. As new people or objects are tracked and their descriptors added to the set of known descriptors, the mean shift algorithm can be reapplied to find a new best position. The point within the descriptor metric space which has highest local density can be considered the best representation of the person or object of interest, and can be considered the best descriptor.

Figure 14:
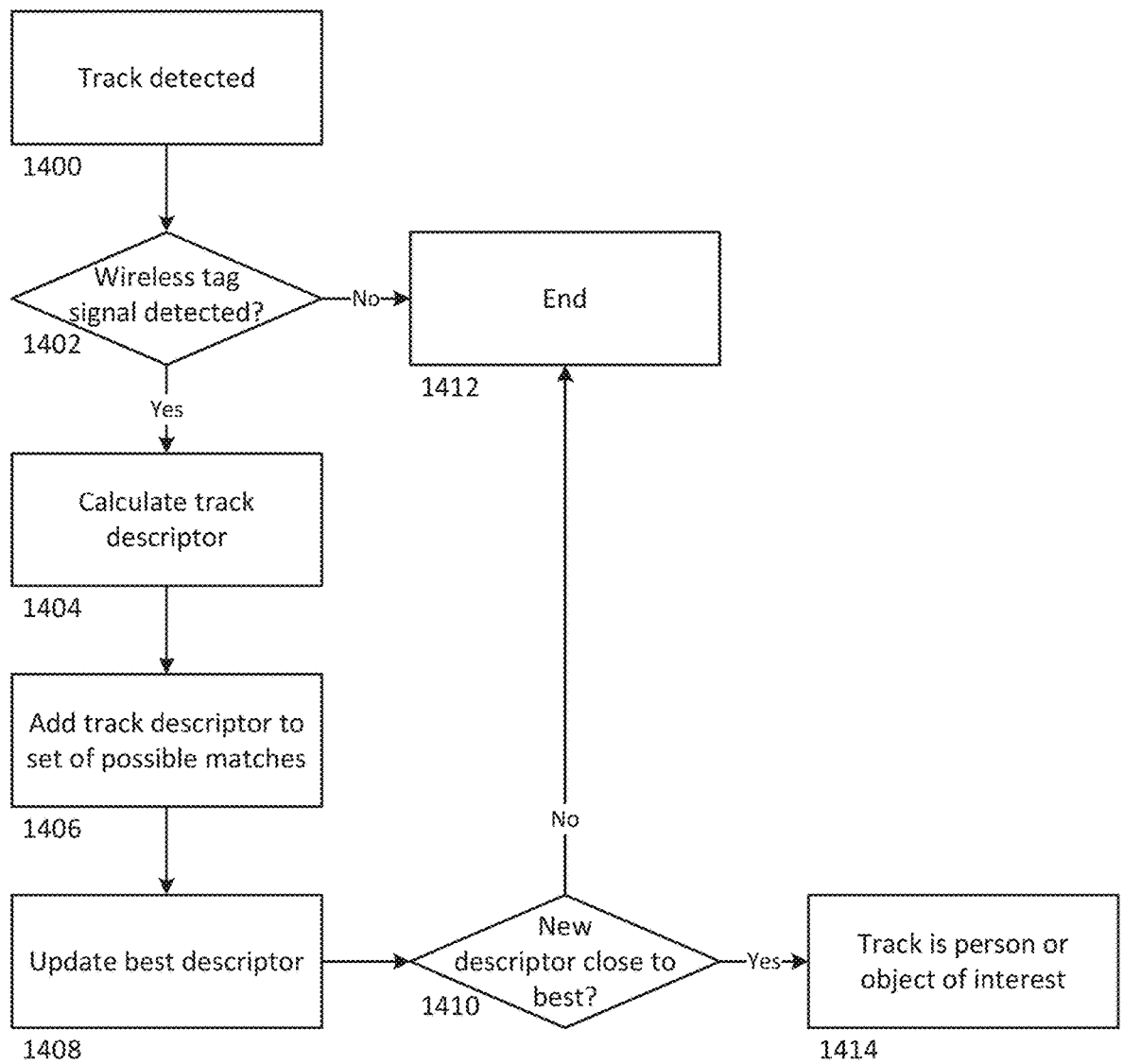
FIG. 14 is a process flow diagram showing an example method for determining whether or not a given person or object is a person or object of interest, in accordance with one or more techniques of this disclosure.

FIG. 14 is a process flow diagram showing an example method for determining whether or not a given person or object is a person or object of interest. According to the illustrated method, a track is detected 1400, and, if a wireless tag signal is detected (1402), a track descriptor for the track is calculated (1404). For example, in some examples, sensing data (e.g., depth information, color information, etc.) and/or additional track information (e.g., movement information) can be used to calculate a track descriptor in a metric space associated with all track descriptors.

The method includes adding the track descriptor to a set of possible matches (1406) associated with the object or person including the wireless tag. For instance, in some examples, the system can be configured to analyze all track descriptors detected when a wireless tag is present in a scene, such track descriptors being potential matches to the person or object associated with the tag, such as shown in any of frames 1200, 1210, 1220, 1230, or aggregate frame 1240 in FIG. 12A.

In some examples, a best descriptor is determined and/or updated (1408), for example, in view of a calculated track descriptor (e.g., from step 1404). This can be performed, for example, using a mean shift algorithm or other process for updating estimated values, such as the exemplary process illustrated in FIGS. 13A-13C.

The method can include determining whether or not the new descriptor is close to the best descriptor (1410), and if so, considering the track to correspond to a person or object of interest (1414) (e.g., a staff member in a retail space). Determining whether or not the new descriptor is close to the best descriptor can include, for example, calculating a distance between the best descriptor and the track descriptor based on the distance associated with the metric space, and, if the distance is below a predetermined threshold (e.g., the track descriptor is within a predefined neighborhood of the best descriptor), the new descriptor is considered to be close to the best descriptor.

According to the method of FIG. 14, if the new descriptor is not close to the best descriptor (1410) or the wireless tag signal is not detected (1402), the process ends (1412), and the track(s) being analyzed are not considered by the system to correspond to a person or object of interest, and can be treated accordingly (e.g., in a people counting process).

In some examples, the process of FIG. 14 can be repeated as tracks are detected over a period of time, and the system can continue to update the best descriptor(s) associated with people or objects of interest and utilize collected data to improve the likelihood that a person or object properly identified. For instance, in an exemplary example, the more times a person of interest wearing a wireless tag appears in a track, even when other arbitrary tracks are present(e.g., customers having essentially random appearance), more occurrences of track descriptors associated with that person are detected in a cluster in the metric space. This additional data can be used to improve the ability for the system to recognize additional tracks associated with this person.

While shown in various figures (e.g., 11B, 12A, 12B, 13A, 13B, and 13C) as a two-dimensional space for convenient visualization of various concepts, it will be appreciated that the metric space in which track descriptors can be analyzed and compared can include any of a variety of spaces. As described elsewhere herein, in some examples, the track descriptor metric space can include N-dimensional vectors representing each track descriptor and a distance metric defined on the metric space for comparing the locations of such track descriptors, such as a weighted Euclidean distance.

Systems and methods utilizing a combination of wireless tags and appearance recognition from sensor data (e.g., track descriptor analysis) can allow the appearance of members of staff to be automatically learned based upon the appearance of people present in the data when the wireless tag is detected. Such approaches can be implemented using a single wireless detector, which can be integrated into the tracking system (e.g., a time of flight sensor). Additionally or alternatively, the detector may act as a wireless transmitter, in which case a device carried by the staff member can act as a receiver and record when it detects the signal from the detector, and subsequently transmit this information to the counting system.

An exemplary implementation of a tracking system and operation thereof is outlined below:

- As each person walks through the field of view of the tracking system, they are recorded as a sequence of video images, along with height and intensity data from the time of flight depth sensor. The sequence of frames forms a track.
- All of the tracks of people that are recorded as having occurred when the wireless signal is present are taken.
- A track descriptor for the appearance of each person's track is generated. This track descriptor can include data from a visible light (e.g., color) camera, thermal data, and/or depth sensor data.
- A person of interest, such as a member of staff, can be expected to have been present in many of these occasions, as they must have been proximate for the wireless signal to have been active, and therefore should be associated with the most frequently seen track descriptor within the data.
- A track descriptor for the member of staff can then be calculated and recorded, using the methods disclosed herein.
- As time goes on, this descriptor can be updated as more counts occur proximate to the wireless signal being present, so that the appearance of the member of staff remains up to date and accurate (e.g., as shown in FIGS. 13A-C).
- Since the appearance of the staff member is now known, the counts associated with that member of staff can be excluded, based upon the counted target track having a matching appearance descriptor and the wireless signal being present.

In some examples, a tracking system can include wireless tags that are uniquely identifiable from one another. In some such examples, the system can be configured to identify a particular track descriptor with a particular wireless tag. In some such examples, the system can be configured to identify when two different tags are present in an area simultaneously, and associate corresponding track descriptors with each tag. In other examples, a system can be configured to determine the number of tags present in a scene, but not uniquely identify the tags from one another. Here, the system can utilize the number of detected tags to assist in determining which tracks correspond to tag-wearers.

In still further examples, the wireless tags may not be distinguishable from one another, and a system may not be able to identify the number of tags present in a scene. Even in such scenarios, the system can be configured to identify likely people or objects associated with an unknown number of detected wireless tags due to the fact that, over time, different combinations of people or objects will be tracked through a scene as wireless tags are detected over time. By analyzing candidates of tracks corresponding to identified one or more wireless tags over a plurality of appearances of the tag(s) over time, the system can learn which track descriptors, and therefore, which tracks, are likely associated with the one or more wireless tags.

In some examples, processes in which a tracking system is configured to learn which track descriptors are associated with people or objects of interest (e.g., via comparison with a best descriptor, via recognition of recurring track descriptors, etc.) can be reset according to a time schedule, such as once per hour, once per day, once per week, etc. In various examples, the reset schedule can be customized according to the typical practice of an establishment employing the tracking system. For example, if staff members in a retail environment generally change uniform colors weekly or monthly, the system can be reset to coincide with such a change so that the system may learn and/or be programmed with updated track descriptor information.

In another example, in environments in which staff members do not generally have distinctive appearance, but instead, for example, wear a wireless tag, the system may be reset daily so that the system may learn the appearances of the staff members for the particular day. In various examples, systems can be configured to quickly learn to identify track descriptors corresponding to people or objects of interest, for example, via analysis of tracks present in conjunction with a detected wireless tag, even without a priori knowledge of the appearance of such people or objects. Thus, such systems may be reset, for example, at the end of each day, and still effectively identify people or objects of interest the following day by learning track descriptors associated therewith.

With further reference to FIG. 1, identifying people or objects of interest such as described herein can be used in conjunction with one or more counting processes, such as monitoring queuing behavior, determining an occupancy of a space, tracking traffic through a corridor, or any other of a variety of processes. For example, the process described with respect to FIG. 14 can be performed at step 102 in FIG. 1 to determine whether or not an identified person or object is a person or object of interest. Such person or object can be excluded from a counting process if appropriate.

It will be appreciated that, while described often in the context of excluding people or objects of interest from a count, in some examples, people or objects of interest can be identified to be counted and/or tracked in addition to or instead of being excluded from certain counting processes. For instance, in an exemplary implementation, such systems can be configured to identify tracks corresponding to retail employees in order to confirm that an appropriate number of retail employees are staffed and/or positioned in an appropriate area, for example, in response to a determined customer distribution. In general, knowledge of which tracks identified by a tracking system correspond to a particular person or object, or group of people or objects, can be useful in a wide variety of applications. Systems and methods described herein can be used to identify such people or objects of interest from a generic population for enhanced analysis.

Tracking systems as described herein can be implemented in a variety of ways. Tracking systems can include one or more sensors, such as a time of flight sensor, configured to provide sensing data that can be analyzed for determining image descriptors and track descriptors associated with people or objects tracked through a scene.

Systems can include one or more processors configured to receive and analyze the sensing data to determine which tracks correspond to people or objects of interest within the scene, such as via processes described herein. In various examples, processors can generally include application specific integrated circuits (ASICs), microcontrollers, microprocessors, field-programmable gate arrays (FPGAs), or other appropriate components. In some examples, tracking systems can communicate sensing data to a cloud-based computing system that can be configured to analyze data from the tracking systems and perform various analyses as described herein.

Systems can include memory for storing various information, such as determined track descriptors, tracking data, sensing data, and/or counting data, such as a number of people in a queue determined from the sensing data. Additionally or alternatively, memory can include instructions for causing one or more processors to carry out processes such as those described herein. In various examples, memory may include one or more fixed or removable magnetic, optical, or electrical media, such as RAM, ROM, EEPROM, or the like. Memory may also include a removable memory portion that may be used to provide memory updates or increases in memory capacities. Additionally or alternatively, systems can include remote storage capabilities, such as cloud-based storage.

In an exemplary implementation, a tracking system (e.g., deployed at a retail establishment) includes a time of flight sensor and a local computer including memory and a processor and configured to receive data from the time of flight sensor. The local computer can be configured to carry out one or more processes described herein.

Various examples have been described. These and other examples are within the scope of the following claims.

The invention claimed is:
1. A tracking system, comprising:
   a sensing device configured to generate sensing data representative of people or objects in a scene; and
   a processor configured to:
      receive, from the sensing device, the sensing data;
      generate, based on the sensing data, a track descriptor for each of the people or objects, each track descriptor being representative of one or more attributes of a corresponding person or object;
      estimate a best track descriptor associated with a wireless tag;
      upon a detection of the wireless tag within the scene, calculate track descriptors associated with tracks within the scene;
      compare the track descriptors with the best track descriptor; and
      determine a track to be associated with a person or object of interest in response to a track descriptor associated with the track being sufficiently similar to the best track descriptor.
2. The tracking system of claim 1, wherein the sensing device comprises a time of flight sensor;
   the sensing data comprises visible light image data and depth information; and wherein the processor is further configured to generate, based on the visible light image data and the depth information, the track descriptor for each of the people or objects.
3. The tracking system of claim 1, wherein the processor is further configured to generate, based on visible light image information at a plurality of depths, the track descriptor for each of the people or objects.
4. The tracking system of claim 1, wherein track descriptors are comparable via a distance metric, and wherein a track descriptor is sufficiently similar to the best track descriptor for being within a predetermined distance of the best track descriptor.
5. The tracking system of claim 1, wherein the processor is configured to perform a tracking process using tracks within the scene, and wherein tracks corresponding to a person or object of interest are disregarded in the tracking process.
6. The tracking system of claim 5, wherein the tracking process comprises tracking people within a retail environment, and wherein the people or object of interest correspond to staff members within the retail environment.
7. A method, comprising:
   generating a track descriptor for a track, the track descriptor being indicative of one or more appearance attributes corresponding to an object, the track being indicative of a behavior of the object in a plurality of frames of a tracking system;
   determining, based on the track descriptor being resented in the plurality of frames during which a wireless tag is detected by the tracking system, the object being a wearer of the wireless tag; and
   performing a tracking task to handle the track or the object differently than other tracks or objects.
8. The method of claim 7, further comprising:
   transforming objects in a physical space to track descriptors in a metric space, wherein a distance in the metric space is indicative of an appearance similarity in the physical space.
9. The method of claim 8, wherein the track descriptor is a first track descriptor, the method further comprising:
   determining the first track descriptor is within a region in the metric space, and a first distance between the first track descriptor and a second track descriptor within the region is longer than a second distance between the first track descriptor and a third track descriptor outside of the region.
10. The method of claim 8, further comprising: determining the track descriptor is within a predetermined distance of a best descriptor corresponding to a predicted track descriptor representative of an object of interest, wherein the best descriptor is being updated based on information in the plurality of frames.
11. The method of claim 8, further comprising:
    detecting the wireless tag present in a frame; and
    selecting the frame into the plurality of frames.
12. The method of claim 7, further comprising:
    receiving sensing data representative of one or more appearance attributes associated with the track, wherein the sensing data comprises colorized visible light image data associated with the object and depth data associated with a locations of the object in the plurality of frames; and
    processing the sensing data to determine the track descriptor for the track.
13. The method of claim 7, wherein generating the track descriptor comprises:
    for each of the plurality of frames, calculating an image descriptor representative of the object; and
    combining respective image descriptors from the plurality of frames and motion of the object through the plurality of frames to form the track descriptor.
14. The method of claim 7, wherein performing the tracking task comprises determining an occupancy of a space by excluding the object.
15. The method of claim 14, wherein the space comprises a retail environment, and wherein the object include one or more employees in the retail environment.

16. The method of claim 7, further comprising:
determining the one or more appearance attributes corresponding to the object based on a distinctive uniform, an observable tag, or a retroreflective element.

17. A tracking system, comprising:
a sensing device configured to capture visual or depth attributes of an object in a plurality of frames of the tracking system; and
a tracking device, coupled to the sensing device, configured to:
generate a track descriptor based on the visual or depth attributes of the object in the plurality of frames of the tracking system;
determine, based on the track descriptor being presented in the plurality of frames during which a wireless tag is detected by the tracking system, the object being a wearer of the wireless tag; and
include the track descriptor or the object in a first tracking task, or exclude the track descriptor or the object from a second tracking task.

18. The tracking system of claim 17, wherein the track descriptor is a first track descriptor, the tracking device is further configured to:
transform objects in a physical space tracked by the tracking system to track descriptors in a metric space, wherein a distance in the metric space is indicative of an appearance similarity in the physical space; and
determine the first track descriptor's distance to a second track descriptor within a region is longer than the first track descriptor's distance to a third track descriptor outside of the region, and is also longer than the first track descriptor's distance to a fourth track descriptor outside of the region.

19. The method of claim 7, further comprising:
determining the one or more appearance attributes corresponding to the object based on a characteristic of a plurality of segments of the object, the plurality of segments of the object being segmented based on respective height ranges of the object.

20. The method of claim 8, further comprising:
determining the track descriptor is located within a neighborhood surrounding a best descriptor for an object of interest in the metric space.

21. The method of claim 8, further comprising:
determining the track descriptor is located within a neighborhood surrounding a best descriptor for the wearer of the wireless tag in the metric space.

* * * * *